US011317236B2

(12) United States Patent
Olivieri et al.

(10) Patent No.: US 11,317,236 B2
(45) Date of Patent: Apr. 26, 2022

(54) SOUNDFIELD ADAPTATION FOR VIRTUAL REALITY AUDIO

(71) Applicant: QUALCOMM Incorporated, San Diego, CA (US)

(72) Inventors: Ferdinando Olivieri, San Diego, CA (US); Taher Shahbazi Mirzahasanloo, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/951,662

(22) Filed: Nov. 18, 2020

(65) Prior Publication Data

US 2021/0160645 A1    May 27, 2021

Related U.S. Application Data

(60) Provisional application No. 62/939,477, filed on Nov. 22, 2019.

(51) Int. Cl.
*H04S 7/00* (2006.01)
*G06F 3/16* (2006.01)
*H04S 3/00* (2006.01)
*G06T 19/00* (2011.01)
*G02B 27/01* (2006.01)

(52) U.S. Cl.
CPC .............. *H04S 7/304* (2013.01); *G06F 3/167* (2013.01); *G06T 19/003* (2013.01); *H04S 3/008* (2013.01); *H04S 7/307* (2013.01); *G02B 27/017* (2013.01)

(58) Field of Classification Search
CPC .......... H04S 7/304; H04S 3/008; H04S 7/307; G06T 19/003; G06F 3/167; G02B 27/017
USPC ....................................................... 381/310
See application file for complete search history.

(56) References Cited

U.S. PATENT DOCUMENTS

| 10,657,974 | B2 | 5/2020 | Kim et al. |
| 2011/0249821 | A1 | 10/2011 | Jaillet et al. |
| 2016/0241980 | A1 | 8/2016 | Najaf-Zadeh et al. |
| 2019/0007781 | A1 | 1/2019 | Peters et al. |

(Continued)

OTHER PUBLICATIONS

International Search Report and Written Opinion—PCT/US2020/061274—ISA/EPO—dated Feb. 18, 2021.

(Continued)

*Primary Examiner* — Paul Kim
(74) *Attorney, Agent, or Firm* — Shumaker & Sieffert, P.A.

(57) ABSTRACT

An example device includes a memory configured to store at least one spatial component and at least one audio source within a plurality of audio streams. The device also includes one or more processors coupled to the memory. The one or more processors are configured to receive, from motion sensors, rotation information. The one or more processors are configured to rotate the at least one spatial component based on the rotation information to form at least one rotated spatial component. The one or more processors are also configured to reconstruct ambisonic signals from the at least one rotated spatial component and the at least one audio source, wherein the at least one spatial component describes spatial characteristics associated with the at least one audio source in a spherical harmonic domain representation.

30 Claims, 15 Drawing Sheets

(56) References Cited

U.S. PATENT DOCUMENTS

2019/0069110 A1* 2/2019 Gorzel .................... H04S 5/005
2019/0069118 A1 2/2019 Magariyachi et al.

OTHER PUBLICATIONS

Audio: "Call for Proposals for 3D Audio", International Organisation for Standardisation Organisation Internationale De Normalisation, ISO/IEC JTC1/SC29/WG11, Coding of Moving Pictures and Audio, ISO/IEC JTC1/SC29/WG11/N13411, Geneva, CH, Jan. 2013, pp. 1-20.

ETSI TS 103 589 V1.1.1, "Higher Order Ambisonics (HOA) Transport Format", Jun. 2018, 33 pages.

Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.

Hollerweger F., "An Introduction to Higher Order Ambisonic", Oct. 2008, pp. 1-13, Accessed online [Jul. 8, 2013].

"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.

"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.

ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].

Kronlachner M., et al., "Spatial Transformations for the Enhancement of Ambisonic Recordings", Jan. 2014, 6 pages.

Peterson J., et al., "Virtual Reality, Augmented Reality, and Mixed Reality Definitions", EMA, version 1.0, Jul. 7, 2017, 4 Pages.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), San Jose, USA, XP030060280, 83 Pages.

Sen D., et al., "Technical Description of the Qualcomm's HoA Coding Technology for Phase II", 109th MPEG Meeting, Jul. 7, 2014-Nov. 7, 2014, Sapporo, JP (Motion Picture Expert Group or ISO/IEC JTC1/SC29/WG11), No. M34104, Jul. 2, 2014 (Jul. 2, 2014), XP030062477, 4 Pages.

* cited by examiner

SOUNDFIELD ADAPTATION FOR VIRTUAL REALITY AUDIO

This application claims priority to U.S. Provisional Application No. 62/939,477, filed Nov. 22, 2019, the entire contents of which is hereby incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture and rendering of an acoustical space for extended reality systems.

In one example, various aspects of the techniques are directed to a device configured to play one or more of a plurality of audio streams, the device comprising a memory configured to store at least one spatial component and at least one audio source within the plurality of audio streams and one or more processors coupled to the memory, and configured to: receive, from motion sensors, rotation information; rotate the at least one spatial component based on the rotation information to form at least one rotated spatial component; and reconstruct ambisonic signals from the at least one rotated spatial component and the at least one audio source, wherein the at least one spatial component describes spatial characteristics associated with the at least one audio source in a spherical harmonic domain representation.

In another example, various aspects of the techniques are directed to a method of playing one or more of a plurality of audio streams comprising: storing, by a memory, at least one spatial component and at least one audio source within the plurality of audio streams; receiving, by one or more processors from motion sensors, rotation information; rotating, by the one or more processors, the at least one spatial component based on the rotation information to form at least one rotated spatial component; and reconstructing, by the one or more processors, ambisonic signals from the rotated at least one spatial component and the at least one audio source, wherein the at least one spatial component describes spatial characteristics associated with the at least one audio source in a spherical harmonic domain representation.

In another example, various aspects of the techniques are directed to a device configured to play one or more of a plurality of audio streams, the device comprising: means for storing at least one spatial component and at least one audio source within the plurality of audio streams; means for receiving from motion sensors, rotation information; means for rotating the at least one spatial component to form at least one rotated spatial component; and means for reconstructing ambisonic signals from the rotated at least one spatial component and the at least one audio source, wherein the at least one spatial component describes spatial characteristics associated with the at least one audio source in a spherical harmonic domain representation.

In another example, various aspects of the techniques are directed to a non-transitory computer-readable storage medium having stored thereon instructions that, when executed, cause one or more processors to: store at least on spatial component and at least one audio source within the plurality of audio streams; receive, from motion sensors, rotation information; rotate the at least one spatial component based on the rotation information to form at least one rotated spatial component; and reconstruct ambisonic signals from the at least one rotated spatial component and the at least one audio source, wherein the at least one spatial component describes spatial characteristics associated with the at least one audio source in a spherical harmonic domain representation.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
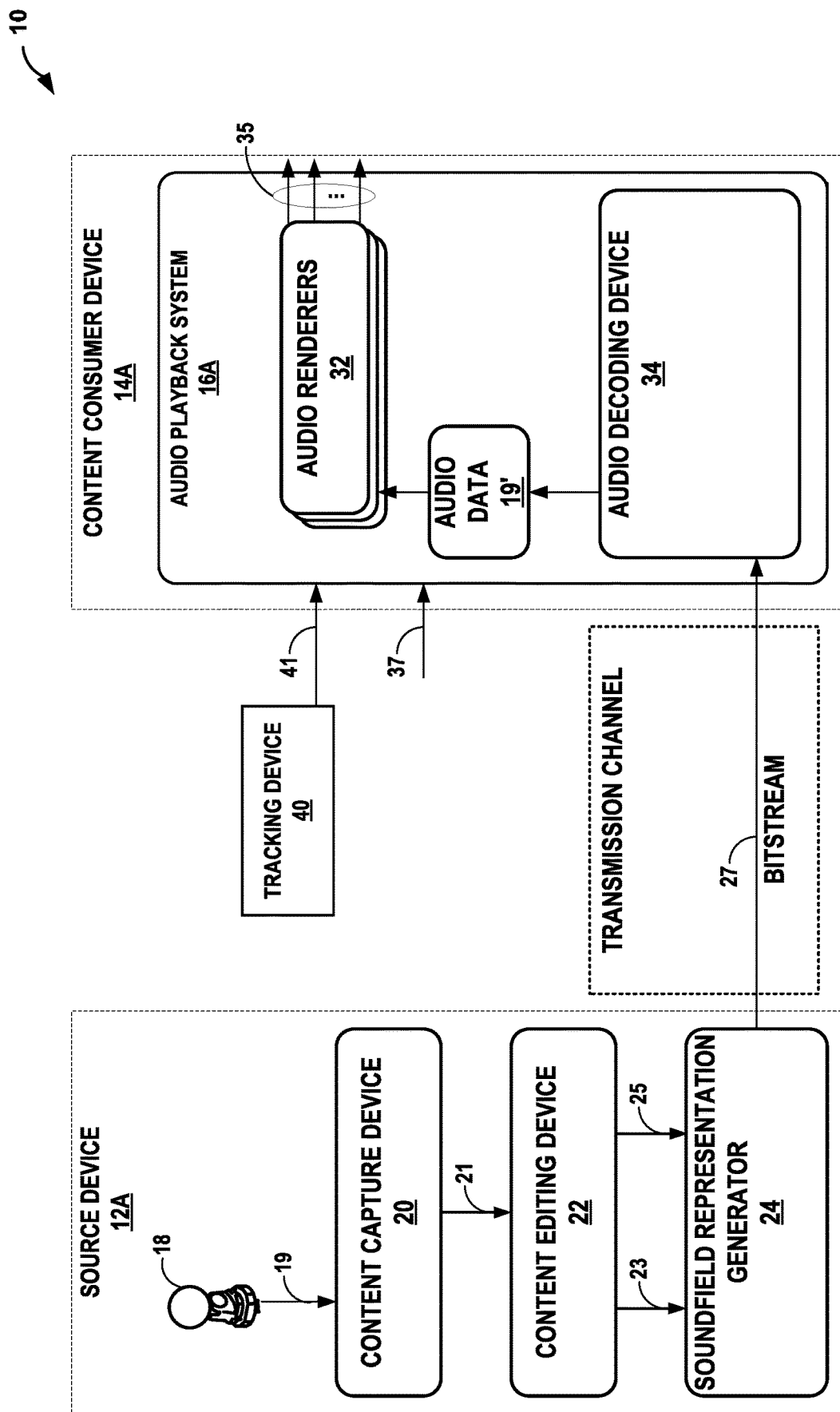
FIGS. 1A-1C are diagrams illustrating systems that may perform various aspects of the techniques described in this disclosure.

Current psychoacoustic decoders may be unable to separately rotate a spatial component and an audio object in an ambisonics domain. As such, current psychoacoustic decoders may have to perform domain translations to the pulse code modulation (PCM) domain and other processes to rotate such components. These operations may be computationally expensive and power intensive.

According to the techniques of this disclosure, a psychoacoustic decoder may rotate at least one spatial component based on rotation information from a motion sensor(s) to form at least one rotated spatial component. The psychoacoustic decoder may also construct ambisonic signals from the at least one rotated spatial component and at least one audio source. The at least one spatial component describes spatial characteristics associated with the at least one audio source in a spherical harmonic domain representation. In this manner, a previous spatial vector prior to motion rotation may be leveraged for a multi-channel environment in a VR platform. According to techniques of this disclosure, an audio playback system may receive rotation information from rotation sensors and may use the rotation information to create rotated spatial vectors, such as V-vectors, in the spatial vector domain. This may reduce demand on computational resources, may reduce information that otherwise may have to be encoded in a bitstream, and may improve coding quality.

In some examples, the audio playback system may jointly decode stereo without a need for an encoder to transmit temporal interchannel phase information. The joint stereo operations may utilize spatial placement information obtained from the rotation sensors.

Coding efficiency may be improved by utilizing rotation information. First, compression efficiency may be improved by using rotation sensor data in phase difference quantization. This may be accomplished by augmenting rotation sensor data with phase information. For example, pulse code modulation/modified discrete cosine transform (PCM/MDCT) domain Interaural Phase Differences (IPDs) may be input into a residual coupling/decoupling rotator along with the rotation sensor data and the residual coupling/decoupling rotator may characterize the residual coupling for stereo vector quantization. Second, using rotation information may improve coding quality because one may re-allocate phase quantization bits dynamically to improve coding quality by relying on rotation sensor data for residual coupling. According to the techniques of this disclosure, if rotation information is available at the decoder, residual coupling may be performed without requiring an encoder to transmit phase differences.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include information, such as metadata, identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., S(ω, $r_r, \theta_r, \varphi_r$)) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_m^n(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate three-dimensional (3D) localization of audio sources within the soundfield. As such, XR devices may render the ambisonic coefficients to speaker feeds that, when played via one or more speakers, accurately reproduce the soundfield.

As another example, the ambisonic coefficients may be translated (e.g., rotated) to account for user movement without overly complex mathematical operations, thereby potentially accommodating the low latency requirements of XR. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 102 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world). Additionally, while a displayed world is mentioned in various examples of the present disclosure, the techniques of this disclosure may also be used with an acoustical space that does not correspond to a displayed world or where there is no displayed world.

Figure 1B:
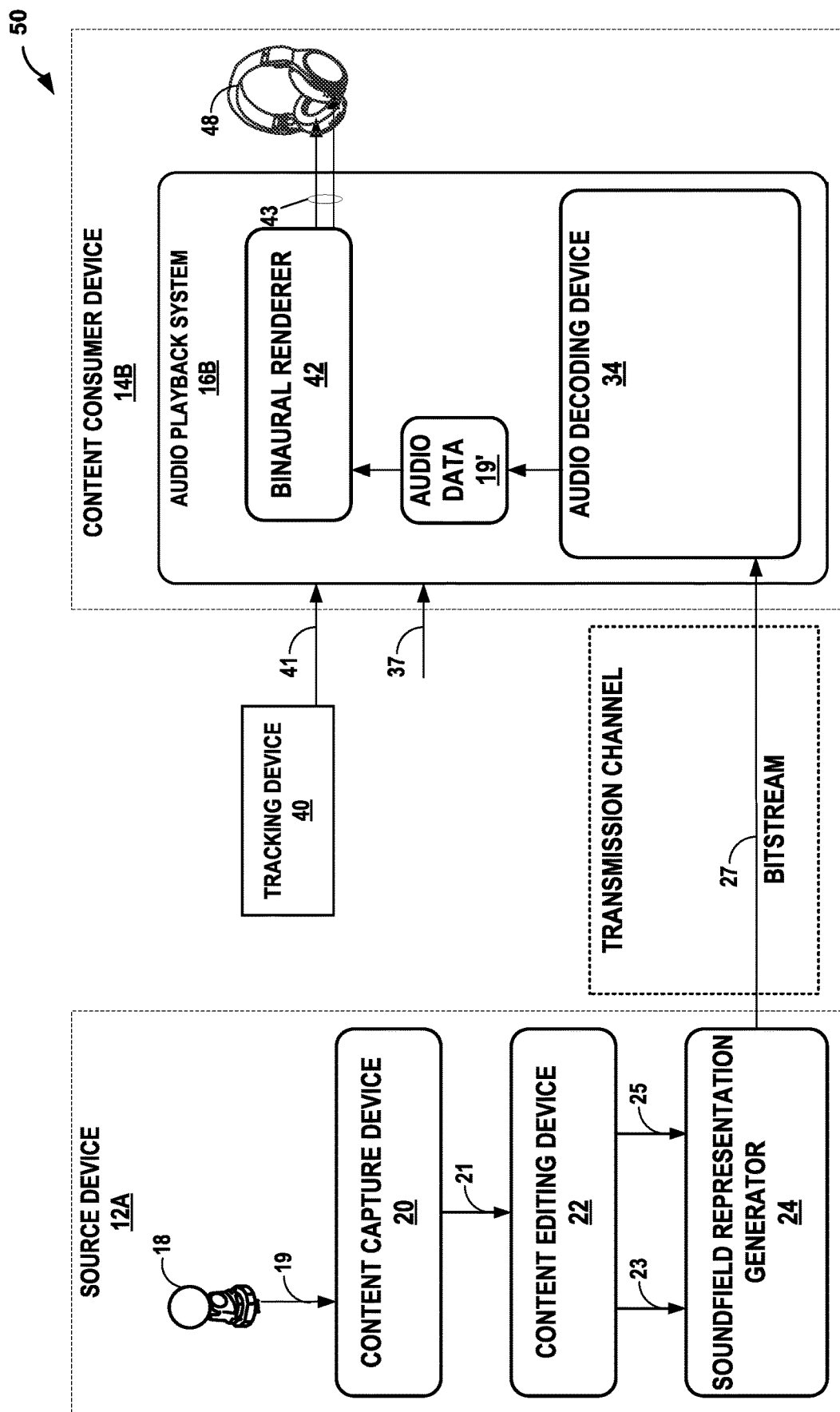
Figure 1C:
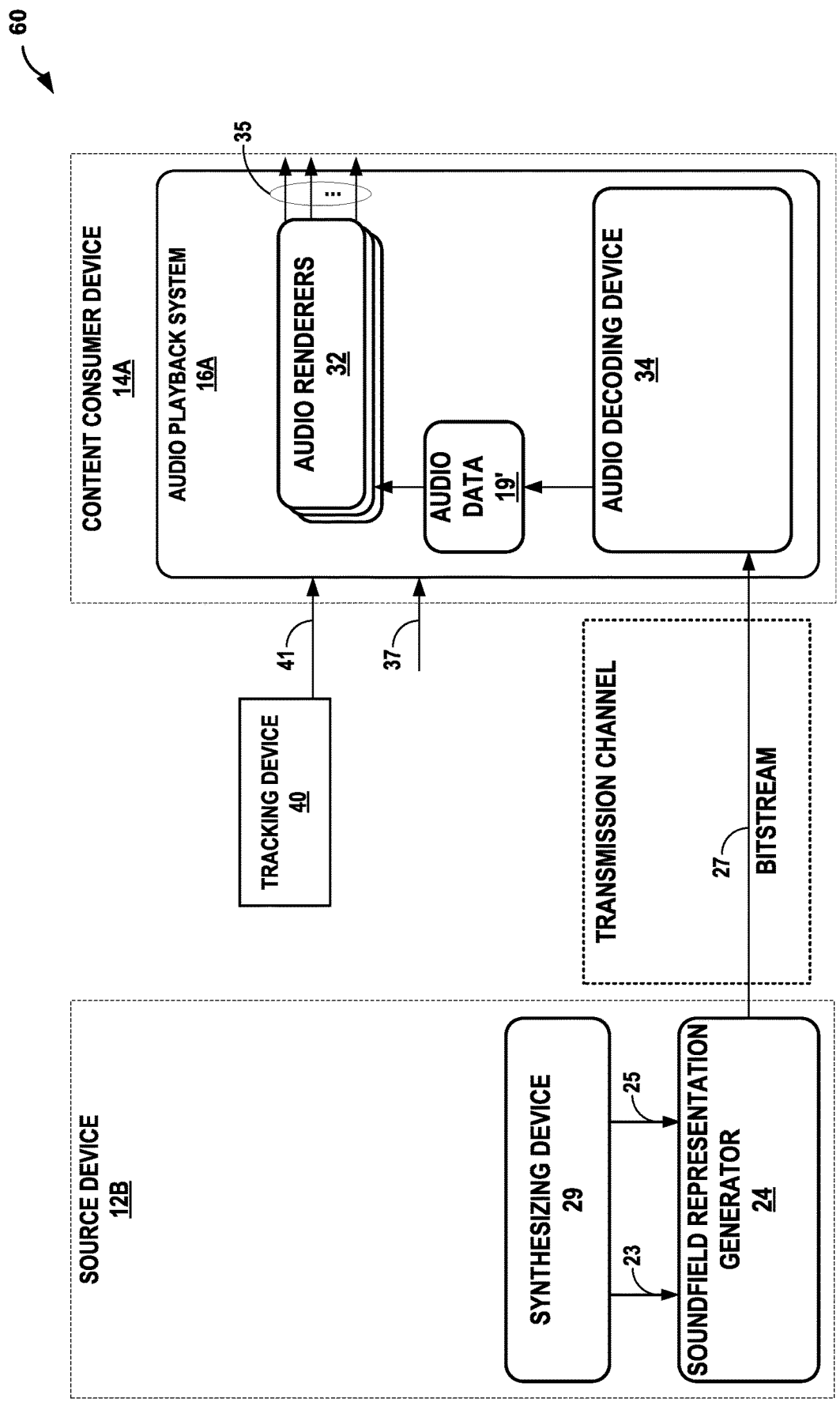

FIGS. 1A-1C are diagrams illustrating systems that may perform various aspects of the techniques described in this disclosure. As shown in the example of FIG. 1A, system 10 includes a source device 12 and a content consumer device 14. While described in the context of the source device 12 and the content consumer device 14, the techniques may be implemented in any context in which any representation of a soundfield is encoded to form a bitstream representative of the audio data. Moreover, the source device 12 may represent any form of computing device capable of generating the representation of a soundfield, and is generally described herein in the context of being a VR content creator device. Likewise, the content consumer device 14 may represent any form of computing device capable of implementing rendering techniques described in this disclosure as well as audio playback, and is generally described herein in the context of being a VR client device.

The source device 12 may be operated by an entertainment company or other entity that may generate multi-channel audio content for consumption by operators of content consumer devices, such as the content consumer device 14. In some VR scenarios, the source device 12 generates audio content in conjunction with video content. The source device 12 includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as the audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via the microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter the content 21 received from the content capture device 20, including the audio data 19. The content editing device 22 may output edited content 23 and associated audio information 25, such as metadata, to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and the audio information 25, provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the edited content 23 and the audio information 25.

For instance, to generate the different representations of the soundfield using ambisonic coefficients (which again is one example of the audio data 19), the soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

In some examples, the soundfield representation generator 24 may represent an audio encoder configured to compress or otherwise reduce a number of bits used to represent the content 21 in the bitstream 27. Although, while not shown, in some examples soundfield representation generator may include a psychoacoustic audio encoding device that conforms to any of the various standards discussed herein.

In this example, the soundfield representation generator 24 may apply SVD to the ambisonic coefficients to determine a decomposed version of the ambisonic coefficients. The decomposed version of the ambisonic coefficients may include one or more of predominant audio signals and one or more corresponding spatial components describing spatial characteristics, e.g., a direction, shape, and width, of the associated predominant audio signals. As such, the soundfield representation generator 24 may apply the decomposition to the ambisonic coefficients to decouple energy (as represented by the predominant audio signals) from the spatial characteristics (as represented by the spatial components).

The soundfield representation generator 24 may analyze the decomposed version of the ambisonic coefficients to identify various parameters, which may facilitate reordering of the decomposed version of the ambisonic coefficients. The soundfield representation generator 24 may reorder the decomposed version of the ambisonic coefficients based on the identified parameters, where such reordering may improve coding efficiency given that the transformation may reorder the ambisonic coefficients across frames of the ambisonic coefficients (where a frame commonly includes M samples of the decomposed version of the ambisonic coefficients and M is, in some examples).

After reordering the decomposed version of the ambisonic coefficients, the soundfield representation generator 24 may select one or more of the decomposed versions of the ambisonic coefficients as representative of foreground (or, in other words, distinct, predominant or salient) components of the soundfield. The soundfield representation generator 24 may specify the decomposed version of the ambisonic coefficients representative of the foreground components (which may also be referred to as a "predominant sound signal," a "predominant audio signal," or a "predominant sound component") and associated directional information (which may also be referred to as a "spatial component" or, in some instances, as a so-called "V-vector" that identifies spatial characteristics of the corresponding audio object). The spatial component may represent a vector with multiple different elements (which in terms of a vector may be referred to as "coefficients") and thereby may be referred to as a "multidimensional vector."

The soundfield representation generator 24 may next perform a soundfield analysis with respect to the ambisonic coefficients in order to, at least in part, identify the ambisonic coefficients representative of one or more background (or, in other words, ambient) components of the soundfield. The background components may also be referred to as a "background audio signal" or an "ambient audio signal." The soundfield representation generator 24 may perform energy compensation with respect to the background audio signal given that, in some examples, the background audio signal may only include a subset of any given sample of the Ambisonic coefficients (e.g., such as those corresponding to zero and first order spherical basis functions and not those corresponding to second or higher order spherical basis functions). When order-reduction is performed, in other words, the soundfield representation generator 24 may augment (e.g., add/subtract energy to/from) the remaining background ambisonic coefficients of the ambisonic coefficients to compensate for the change in overall energy that results from performing the order reduction.

The soundfield representation generator 24 may next perform a form of interpolation with respect to the foreground directional information (which is another way of referring to the spatial components) and then perform an order reduction with respect to the interpolated foreground directional information to generate order reduced foreground directional information. The soundfield representation generator 24 may further perform, in some examples, a quantization with respect to the order reduced foreground directional information, outputting coded foreground directional information. In some instances, this quantization may comprise a scalar/entropy quantization possibly in the form of vector quantization. The soundfield representation generator 24 may then output the intermediately formatted audio data as the background audio signals, the foreground audio signals, and the quantized foreground directional information, to in some examples a psychoacoustic audio encoding device.

In any event, the background audio signals and the foreground audio signals may comprise transport channels in some examples. That is, the soundfield representation generator 24 may output a transport channel for each frame of the ambisonic coefficients that includes a respective one of the background audio signals (e.g., M samples of one of the ambisonic coefficients corresponding to the zero or first order spherical basis function) and for each frame of the foreground audio signals (e.g., M samples of the audio objects decomposed from the ambisonic coefficients). The soundfield representation generator 24 may further output side information (which may also be referred to as "sideband information") that includes the quantized spatial components corresponding to each of the foreground audio signals.

Collectively, the transport channels and the side information may be represented in the example of FIG. 1A as ambisonic transport format (ATF) audio data (which is another way to refer to the intermediately formatted audio data). In other words, the AFT audio data may include the transport channels and the side information (which may also be referred to as "metadata"). The ATF audio data may conform to, as one example, an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06). As such, the ATF audio data may be referred to as HTF audio data.

In the example where the soundfield representation generator 24 does not include a psychoacoustic audio encoding device, the soundfield representation generator 24 may then transmit or otherwise output the ATF audio data to a psychoacoustic audio encoding device (not shown). The psychoacoustic audio encoding device may perform psychoacoustic audio encoding with respect to the ATF audio data to generate a bitstream 27. The psychoacoustic audio encoding device may operate according to standardized, open-source, or proprietary audio coding processes. For example, the psychoacoustic audio encoding device may perform psychoacoustic audio encoding according to AptX™ various other versions of AptX (e.g., enhanced AptX—E-AptX, AptX live, AptX stereo, and AptX high definition—AptX-HD), or advanced audio coding (AAC) and derivations thereof. The source device 12 may then transmit the bitstream 27 via a transmission channel to the content consumer device 14.

In some examples, the psychoacoustic audio encoding device may represent one or more instances of a psychoacoustic audio coder, each of which is used to encode a transport channel of the ATF audio data. In some instances, this psychoacoustic audio encoding device may represent one or more instances of an AptX encoding unit (as noted above). The psychoacoustic audio coder unit may, in some instances, invoke an instance of an AptX encoding unit for each transport channel of the ATF audio data.

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 and the soundfield representation generator 24, the content capture device 20 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding.

In some examples, the content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or third order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof)

may conform to bitstreams produced in accordance with the MPEG-H 3D audio coding standard and/or the MPEG-I Immersive Audio standard.

The content consumer device 14 may be operated by an individual, and may represent a VR client device. Although described with respect to a VR client device, the content consumer device 14 may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14. As shown in the example of FIG. 1A, the content consumer device 14 includes an audio playback system 16A, which may refer to any form of audio playback system capable of rendering the audio data for playback as multi-channel audio content.

While shown in FIG. 1A as being directly transmitted to the content consumer device 14, the source device 12 may output the bitstream 27 to an intermediate device positioned between the source device 12 and the content consumer device 14. The intermediate device may store the bitstream 27 for later delivery to the content consumer device 14, which may request the bitstream 27. The intermediate device may comprise a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14, requesting the bitstream 27.

Alternatively, the source device 12 may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16A. The audio playback system 16A may represent any system capable of playing back multi-channel audio data. The audio playback system 16A may include a number of different renderers 32. The renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause a transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data 19 from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations thereof of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translation movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1C is a block diagram illustrating another example system 60. The example system 60 is similar to the example system 10 of FIG. 1A, however source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
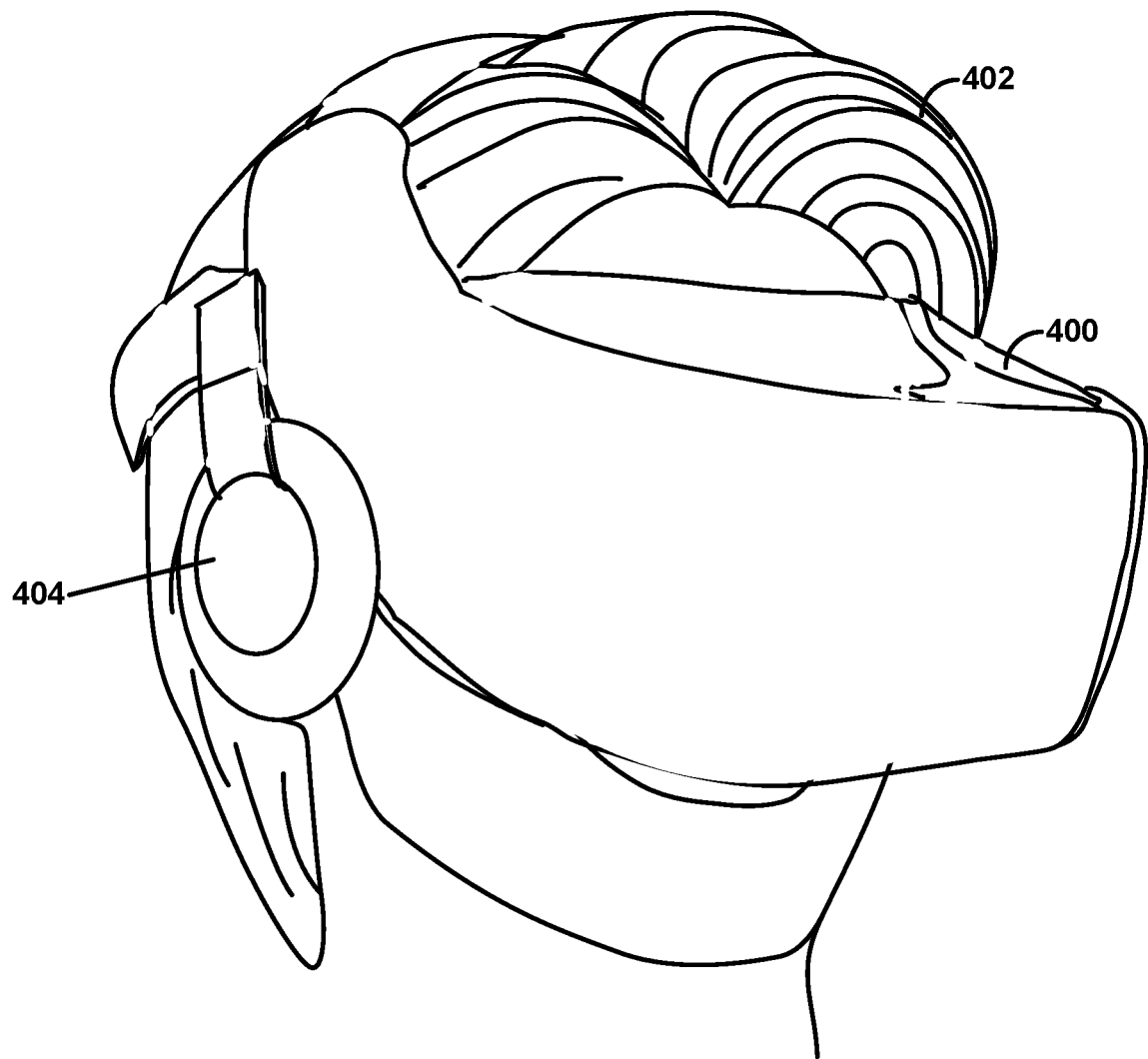
FIG. 2 is a diagram illustrating an example of a VR device worn by a user.

As described above, the content consumer device 14A or 14B (for simplicity purposes, either of which may hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 400 worn by a user 402. The VR device 400 is coupled to, or otherwise includes, headphones 404, which may reproduce a soundfield represented by the audio data 19' through playback of the speaker feeds 35. The speaker feeds 35 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may include a tracking device (e.g., the tracking device 40) that is configured to track head movement of the user 402, and adapt the video data shown via the VR headset 400 to account for the head movements, providing an immersive experience in which the user 402 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 402 to reside in the virtual world visually, often the VR headset 400 may lack the capability to place the user in the displayed world audibly. In other words, the VR system (which may include a computer responsible for rendering the video data and audio data—that is not shown in the example of FIG. 2 for ease of illustration purposes, and the VR headset 400) may be unable to support full three-dimension immersion audibly (and in some instances realistically in a manner that reflects the displayed scene presented to the user via the VR headset 400).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 402 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which, for simplicity purposes, is hereinafter referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Figure 3:
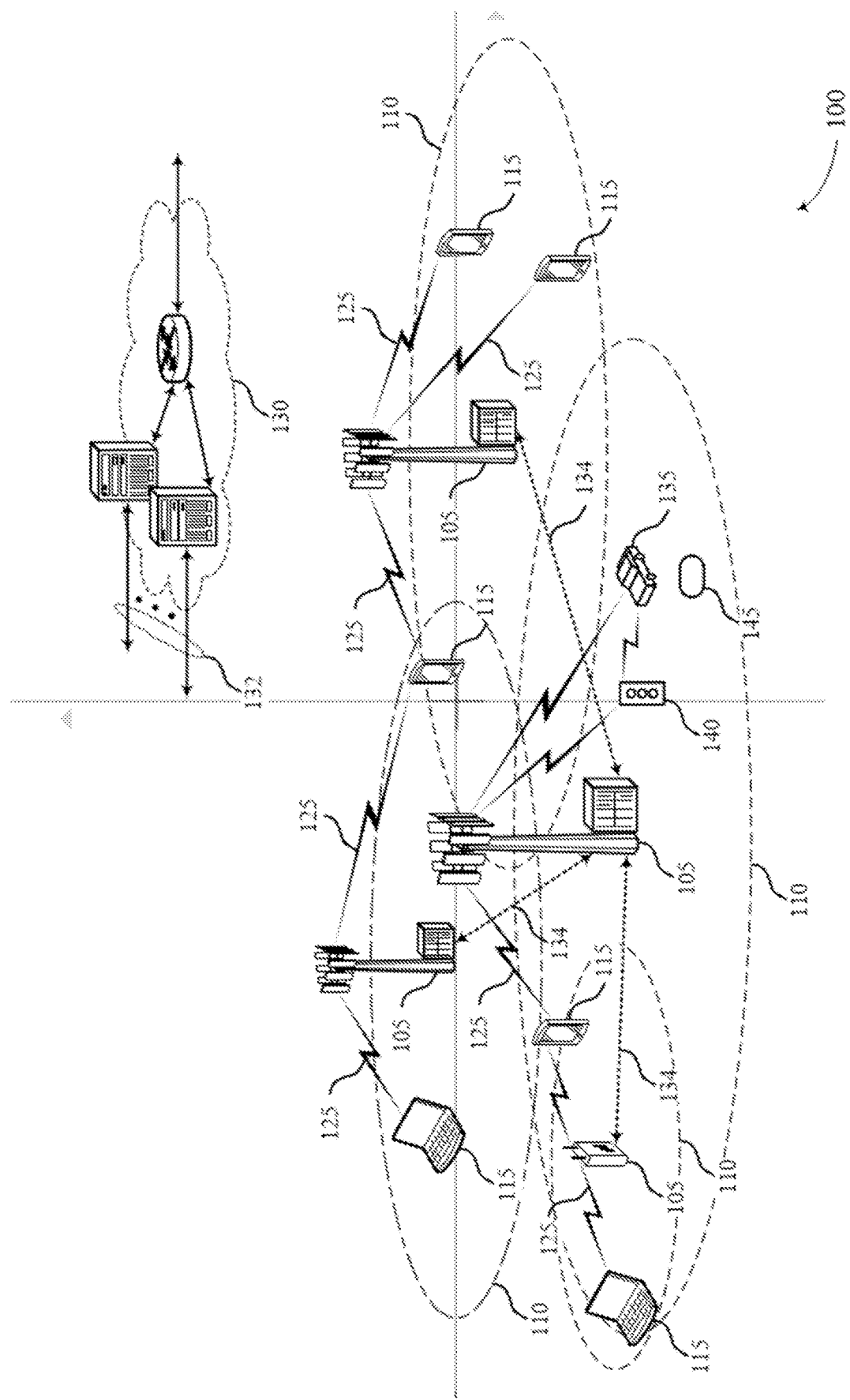
FIG. 3 illustrates an example of a wireless communications system 100 that supports devices and methods in accordance with aspects of the present disclosure.

FIG. 3 illustrates an example of a wireless communications system 100 that supports the devices and methods in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a $5^{th}$ generation (5G) cellular network or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro, 5G cellular, or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio information, such as metadata, indicating privacy restrictions and/or password-based privacy data to toggle, mask, and/or null various audio streams and/or audio sources as will be described in more detail below.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, 5G cellular technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

When a user 402 of a headset such as VR headset 400 in FIG. 2, moves their head in the direction of a sound, they may expect to experience movement of the sound. For example, if the user 402 hears a car off to their left, when the user 402 turns towards their left, they may expect to hear the car as if it were in front of them after having turned to face the sound. To move the soundfields, the content consumer device 14 may translate the soundfields in the PCM domain. However, translation of the soundfields in the PCM domain may consume computing resources (such as processing cycles, memory bandwidth, memory and/or storage space, etc.) as translation in the PCM domain may be computationally complex.

In accordance with various aspects of the techniques described in this disclosure, content consumer device 14, which may be a VR headset 400, for example, may translate the soundfields in the spatial vector domain. By translating the soundfields in the spatial vector domain rather than in the PCM domain computing resources may be saved.

In operation, the content consumer device 14 may receive, from motion sensors, rotation information. The motion sensors may be located within a head-mounted display for example. This rotation information may include roll, pitch and/or yaw of the user's 402 head. The audio playback system 16 of the content consumer device 14 may multiply the rotation information by the spatial vectors, such as V-vectors. In this way, the content consumer device 14 may accomplish the translation of the soundfields without the costly process of translating the soundfields in the PCM domain.

After the audio playback system 16 of the content consumer device 14 rotates or performs some form of translation with respect to the spatial vectors, the content consumer device 14 may ambisonic decode the soundfields based on the rotated spatial vectors and the audio data (which may include a U-vector decomposed from the ambisonic audio data 19). More information regarding various aspects of the translational techniques is discussed below with respect to FIG. 4.

Figure 4:
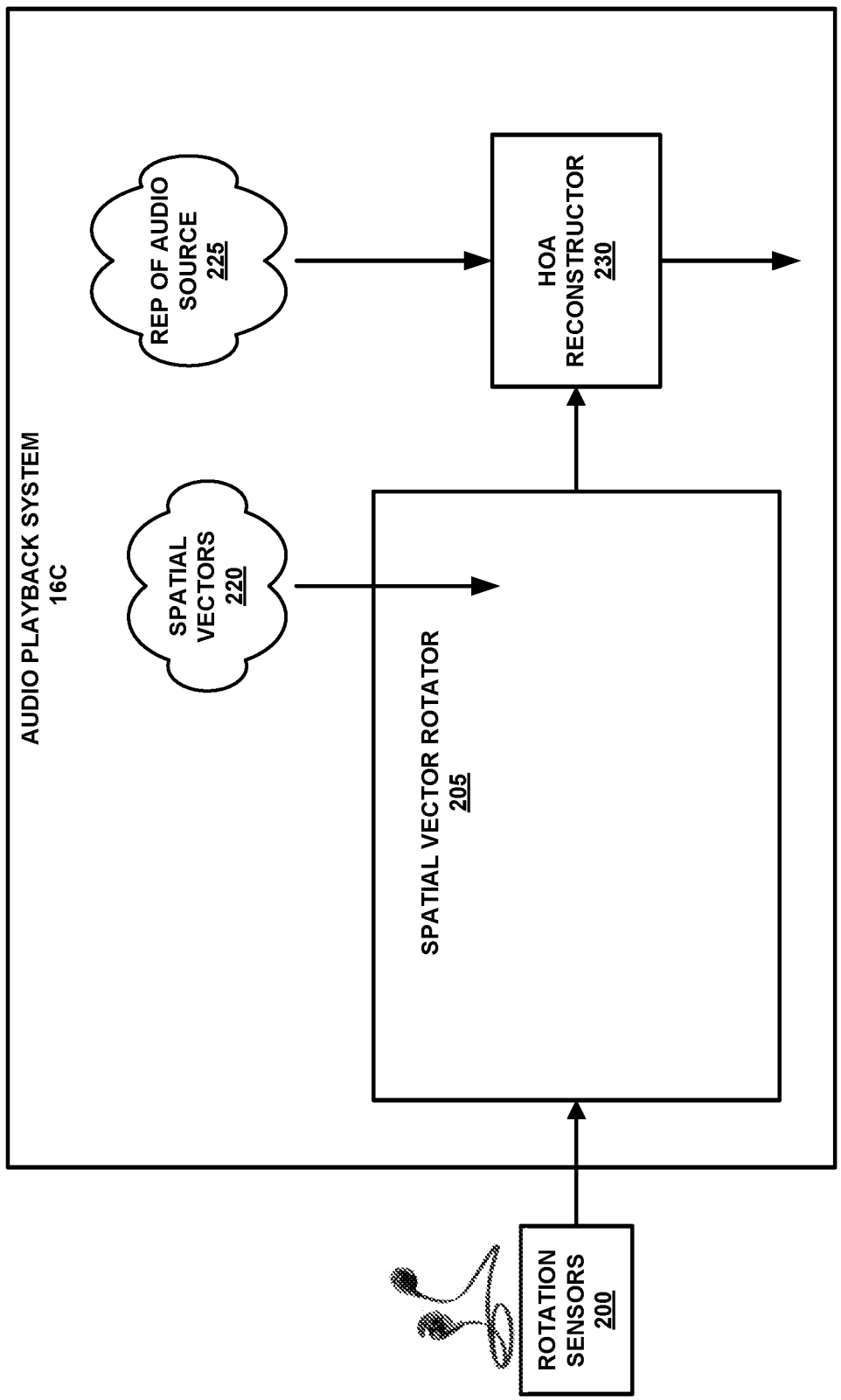
FIG. 4 is a block diagram illustrating an example audio playback system according to the techniques described in this disclosure.

FIG. 4 is a block diagram illustrating an example audio playback system, such as the audio playback system 16A or audio playback system 16B of FIGS. 1A-1C, respectively, in more detail. As shown in the example of FIG. 4, the audio playback system 16 includes a spatial vector rotator 205 and an HOA reconstructor 230. The audio renderers 32 are omitted from the audio playback system 16A for ease of illustration purposes.

The spatial vector rotator 205 may represent a unit configured to receive rotation information such as roll, pitch and/or yaw information regarding the movement of the head of the user 402 and to produce rotated spatial vector signals utilizing the rotation information. For example, the spatial vector rotator 205 may rotate the spatial vector signals in the spatial vector domain so that the audio playback system 16 may avoid costly (in terms of processing cycles, memory space, and/or bandwidth, including memory bandwidth) translation of soundfields in the PCM domain.

The HOA reconstructor 230 may represent an example of all or part of the audio decoding device 34 shown in the examples of FIGS. 1A-1C. The HOA reconstructor 230 may, in some examples, operate as all or part of a higher order ambisonic (HOA) transport format (HTF) decoder in accordance with the HTF audio standard discussed elsewhere in this disclosure.

As further shown in the example of FIG. 4, the audio playback system 16 may interface with rotation sensors 200, which may be included within a headset, such as the VR headset 400 of FIG. 2 and/or within the tracking device 40 of FIGS. 1A-1C. When mounted on a user's head, the rotation sensors 200 may monitor rotational movement of the user's head. For example, the rotation sensors 200 may measure the pitch, roll and yaw (theta, phi and psi) of the head as the user 402 moves their head. The measurements of the rotation movement of the head (rotation information) may be sent to the spatial vector rotator 205. The spatial vector rotator 205 may be part of audio playback system 16 which may be as represented as 16A or 16B in content consumer device 14 as shown in FIGS. 1A-1C, respectively.

The spatial vector rotator 205 may receive the rotation information of the head of the user. The spatial vector rotator 205 may also receive spatial vectors 220 in the bitstream, for instance the bitstream 27, from the source device 12 of FIGS. 1A-1C. The spatial vector rotator 205 may use the rotation information to rotate the spatial vectors 220. For example, the spatial vector rotator 205 may rotate the spatial vectors 220 by multiplying the spatial vectors by rotation information through a series of left shifts, through a look-up table, through matrix multiplication, row-by-row multiplication, or by accessing an array and multiplying individual numbers. In this manner, the spatial vector rotator 205 may move the soundfield to where the user 402 expects it to be. Information on how to create a rotation compensation matrix that may be used by the spatial vector rotator 205 when implemented to rotate the spatial vectors 220 through matrix multiplication may be found in *Spatial transformations for the enhancement of Ambisonic recordings*, by Matthias Kronlachner and Franz Zotter. While the audio playback system 16 is described herein as moving the soundfield to where the user 402 would expect it to be, it need not do so. For instance, a content creator may wish to have more control over the rendering so as to create special audio effects or to reduce the movement of the soundfield due to micromovements of the user 402. In these cases, rendering metadata may be added to the bitstream 27 to limit or modify the ability of spatial vector rotator to rotate the soundfield.

The spatial vector rotator 205 may then provide the rotated spatial vectors to an HOA reconstructor 230. The HOA reconstructor 230 may receive representations of audio sources 225, such as U-vectors, from bitstream 27 or from other portions of audio decoding device 34, from the source device 12 of FIGS. 1A-1C and reconstruct the rotated HOA signals. The HOA reconstructor 230 may then output the reconstructed HOA signals to be rendered. Although FIG. 4 has been described with respect to HOA signals, it may also be applicable to MOA signals and FOA signals.

Figure 5:
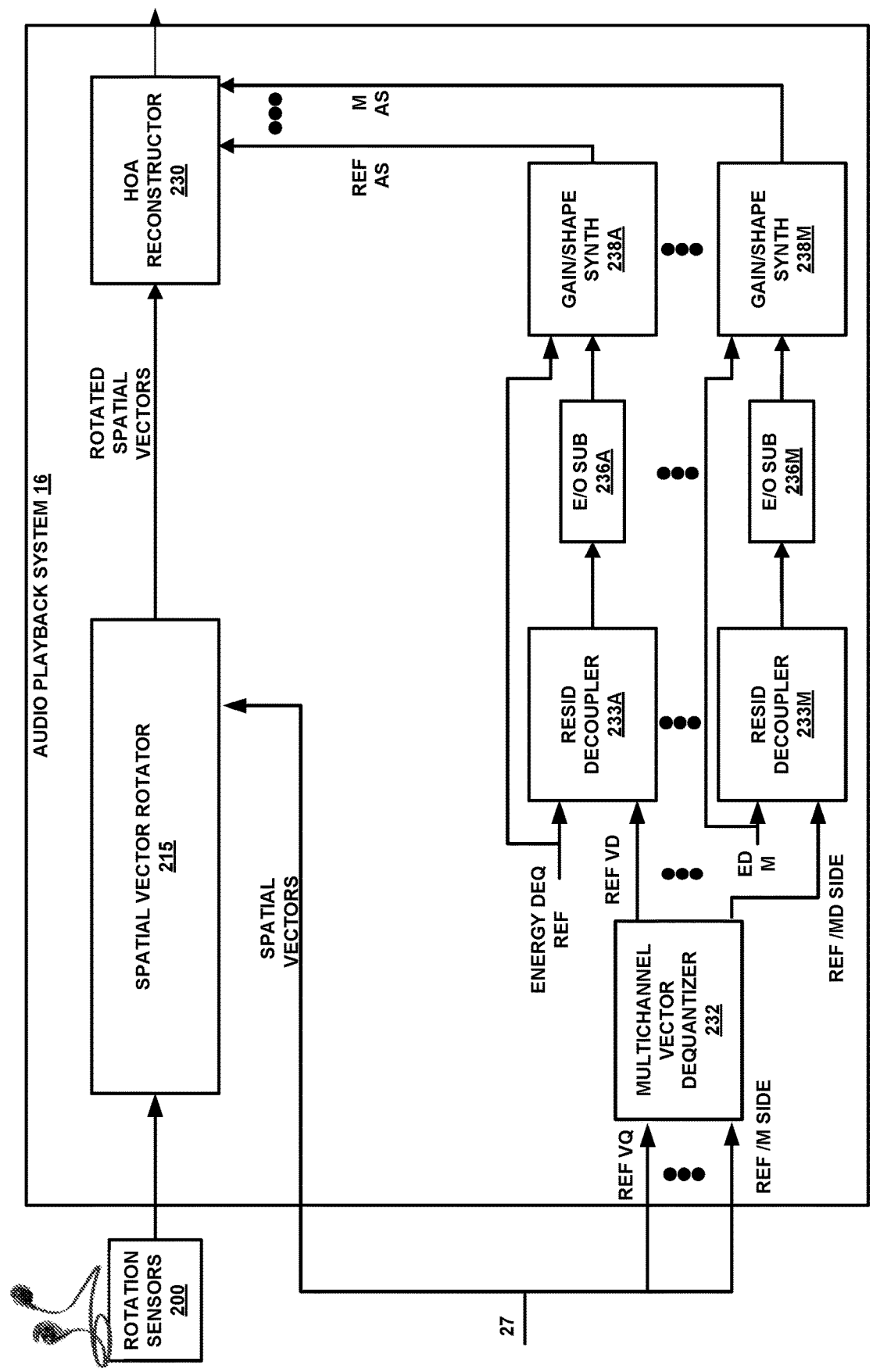
FIG. 5 is a block diagram of an example audio playback system further illustrating various aspects of techniques of this disclosure.

FIG. 5 is a block diagram of an example audio playback system further illustrating various aspects of techniques of this disclosure. FIG. 5 may represent a more detailed view of FIG. 4, where representations of audio sources, such as U-vectors, are reconstructed in, for example, the audio decoding device 34 of the audio playback system 16. Audio source or audio sources as used herein may refer to a representation of an audio source, such as a U-vector or representations of audio sources, such as U-vectors, respectively. As in FIG. 4, the audio playback system 16 receives rotation information from the rotation sensors 200. A spatial vector rotator 205 may receive the rotation information and the spatial vectors received in the bitstream 27 and form rotated spatial vectors in a manner such as is described above with respect to FIG. 4. The HOA reconstructor 230 may receive the rotated spatial vectors from the spatial vector rotator 205.

A multichannel vector dequantizer 232 may receive a quantized reference residual vector signal (REF VQ) and a plurality of quantized side information signals with respect to the reference residual vector (REF/2 (not shown)—REF/M). In this example, the audio playback system 15 is shown handling M reference side information signals. M may be any integer number. The multichannel vector dequantizer 232 may dequantize the reference residual vector (REF VQ) and side information (REF/2—REF//M) and provide a dequantized reference residual vector (REF VD) to each of the plurality of residual decouplers (RESID DECOUPLER) 233A-233M. The multichannel vector dequantizer 232 may also provide each of the plurality of residual decouplers 233B (not shown for simplicity purposes)—233M with dequantized side information for its respective channel 2-M. For example, the multichannel vector dequantizer 232 may provide the residual decoupler 233M with dequantized side information (REF/MD SIDE) for channel M. Each of the residual decouplers 233A-233M also may receive an energy dequanization of the reference residual vector or the respective channel 2-M. The residual decouplers 233A-233M decouple residuals from the reference residual vector and begin to reconstruct the reference audio source, such as a reference U-vector, and audio source for channels 2-M. The even/odd subbanding synthesizers (E/O SUB) 236A-236M receive the output of the residual decouplers 233A-233M and may separate the even coefficients from the odd coefficients so as to avoid phase distortion in reconstructed audio sources. Gain/shape synthesizers (GAIN/SHAPE SYNTH) 238A-238M may receive the output of the even/odd subbanding synthesizers and affect the gain and/or shape of the signals that the gain/shape synthesizers 238A-238M receive so as to reconstruct a reference audio source and audio source(s) for channels 2-M. The HOA reconstructor 230 may receive the reference audio source and the audio source(s) for channels 2-M and reconstruct the higher order ambisonic signals based on the received rotated spatial vectors and the received audio sources.

Figure 6:
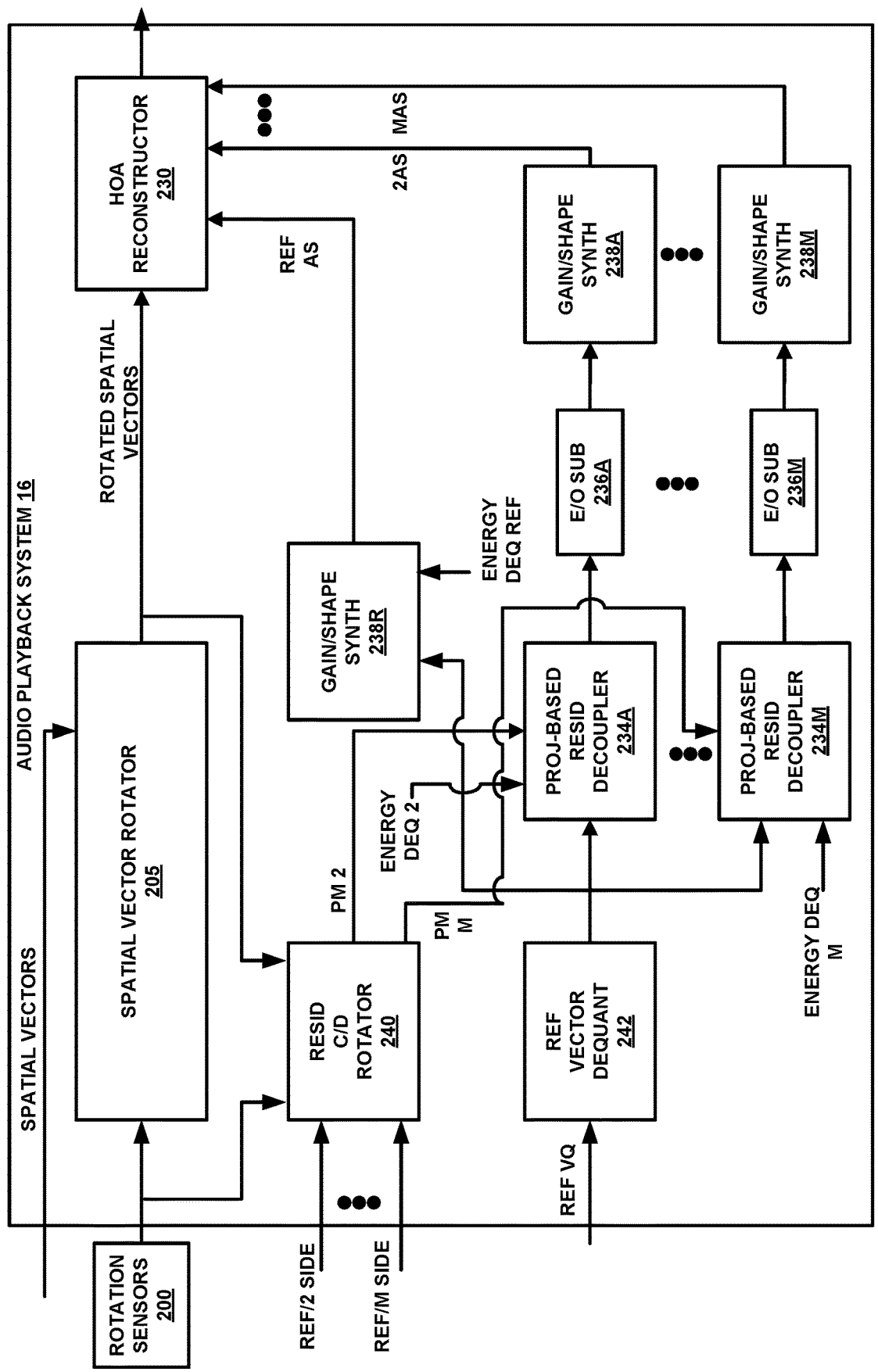
FIG. 6 is a block diagram of an example audio playback system further illustrating various aspects of techniques of this disclosure.

FIG. 6 is a block diagram of an example audio playback system further illustrating various aspects of techniques of this disclosure. The example of FIG. 6 is similar to the example of FIG. 5, but is focused on residual decoding for simplicity purposes. As in FIGS. 4 and 5, the audio playback system 16 receives rotation information from the rotation sensors 200. A spatial vector rotator 205 may receive the rotation information and spatial vectors, for example, from the bitstream 27 and form rotated spatial vectors in a manner such as is described above with respect to FIG. 4. The HOA reconstructor 230 may receive the rotated spatial vectors from the spatial vector rotator 205.

A residual coupling/decoupling rotator (RESID C/D ROTATOR) 240 receives a plurality of side information signals with respect to a reference for each of the channels, 2-M. The residual coupling/decoupling rotator 240 may also receive rotation information from rotation sensors 200 and the rotated spatial vectors from the spatial vector rotator 205. The residual coupling/decoupling rotator may create a projection matrix of each of the channels' 2-M side information with respect to the reference residual vector and provide each channels' projection matrix to an associated projection-based residual decoupler (PROJ-BASED RESID DECOUPLER) 234A-234M. The projection matrix may be an energy preserving rotation matrix that may be used to decouple a reconstructed channel from the reference residual vector. The projection matrix may be created using a Karhunen-Love transform (KLT) or principal components analysis (PCA) or other method.

A reference vector dequantizer (REF VECTOR DEQUANT) 242 may receive a quantized reference residual vector and dequantize the quantized reference residual vector. The reference vector dequantizer 242 may provide the dequantized reference residual vector to the plurality of projection-based residual decouplers 234A-234M. The reference vector dequantizer 242 may also provide the dequantized reference residual vector to a gain/shape synthesizer (GAIN/SHAPE SYNTH) 238R. The projection-based residual decouplers 234A-234M decouple the rotated side information from the reference residual vector and output residual coupling components for channels 2-M. The even/odd subbanding synthesizers (E/O SUB) 236A-236M receive the residual coupling components output by the projection-based residual decouplers 234A-234M and separate the even coefficients from the odd coefficients. The gain/shape synthesizers 238A-238M receive the output of the even/odd subbanding synthesizers and dequantized energy signals for channels 2-M respectively. The gain/shape synthesizers 238A-238M synthesize the residual coupling components with the dequantized energy components so as to create rotated audio sources for channels 2-M.

Gain/shape synthesizer (GAIN/SHAPE SYNTH) 238R may receive dequantized energy of the reference residual signal, in addition to the dequantized reference residual vector. The gain/shape synthesizer 238R may synthesize the reference residual vector and the dequantized energy of the reference residual signal to reconstruct and output the reconstructed reference audio source. The gain/shape synthesizers 238A-238M may output rotated reconstructed audio sources for channels 2-M. The HOA reconstructor 230 may receive the reconstructed reference residual audio source and the rotated reconstructed audio source for channels 2-M and reconstruct higher order ambisonic signals based on the reconstructed reference audio source, the rotated reconstructed audio sources for channels 2-M and the rotated spatial vectors.

Figure 7:
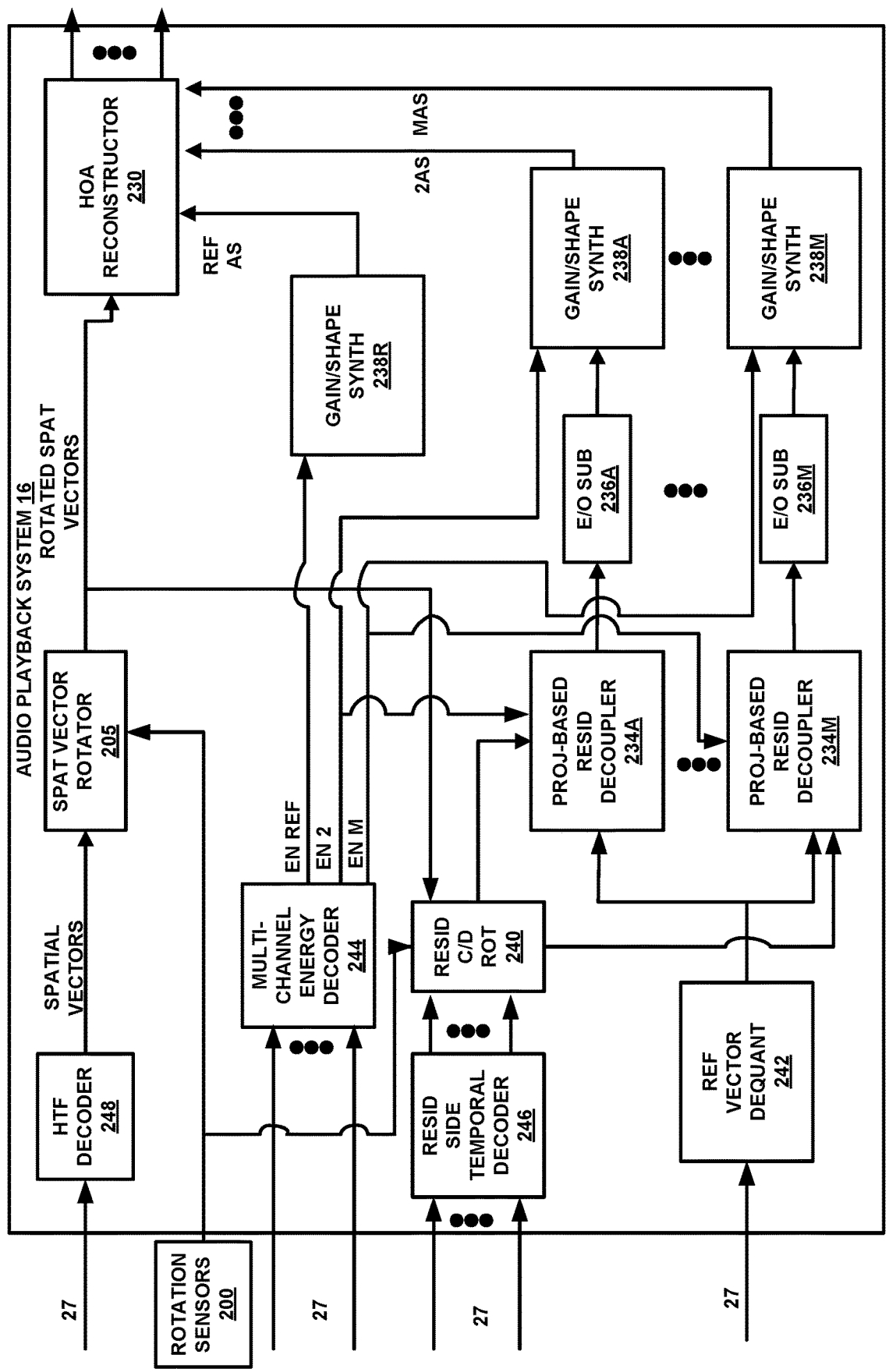
FIG. 7 is a block diagram of an example audio playback system further illustrating various aspects of techniques of this disclosure.

FIG. 7 is a block diagram of an example audio playback system further illustrating various aspects of techniques of this disclosure. FIG. 7 may be a more detailed example of the example of FIG. 6, including energy dequantization components and residual components. As in FIGS. 4-6, audio playback system 16 may receive rotation information from the rotation sensors 200. An HTF decoder 248 may decode information in the bitstream 27 to obtain spatial vectors. The HTF decoder 248 may provide the spatial vectors to a spatial vector rotator (SPAT VECTOR ROTATOR) 205. The spatial vector rotator 205 may also receive rotation information from rotation sensors 200. The spatial vector rotator 205 may form rotated spatial vectors in a manner such is such as is described above with respect to FIG. 4. The HOA reconstructor 230 may receive the rotated spatial vectors from the spatial vector rotator 205.

A residual coupling/decoupling rotator (RESID C/D ROT) 240 may also receive rotation information from rotation sensors 200. A residual side temporal decoder (RESID SIDE TEMPORAL DECODER) 246 may receive side information for channels 2-M with respect to a reference residual vector from the bitstream 27. The residual side temporal decoder 246 may determine temporal phase information for each of the channels 2-M, for example through stereo coupling analysis, and transmit the temporal phase information for each of the channels 2-M to the residual coupling/decoupling rotator 240. The residual coupling/decoupling rotator 240 may create a projection matrix for each of the channels 2-M based on the rotation information from the rotation sensors 200 and the temporal phase information from the residual side temporal decoder 246. Thus, the projection matrices in the example of FIG. 7 may be defined based both on temporal and spatial rotation information.

A multichannel energy decoder 244 may receive a multichannel energy bitstream from bitstream 27. The multichannel energy decoder 244 may decode the multichannel energy bitstream and provide an energy reference signal to gain/shape synthesizer (GAIN/SHAPE SYNTH) 238R. The multichannel energy decoder 244 may also provide each of the projection-based residual decouplers (PROJ-BASED RESID DECOUPLER) 234A-M and each of the gain/shape synthesizers (GAIN/SHAPE SYNTH) 238A-238M with an energy signal for the respective channel 2-M. The projection-based residual decouplers 234A-234M, the even/odd subband separators (E/OSUB) 236A-236M, the gain/shape synthesizers 238A-238M and 238R and HOA reconstructor 230 may function similarly to the projection-based residual decouplers 234A-234M, the even/odd subband separators 236A-236M, the gain/shape synthesizers 238A-238M and 238R and the HOA reconstructor 230 in the example of FIG. 6.

Figure 8:
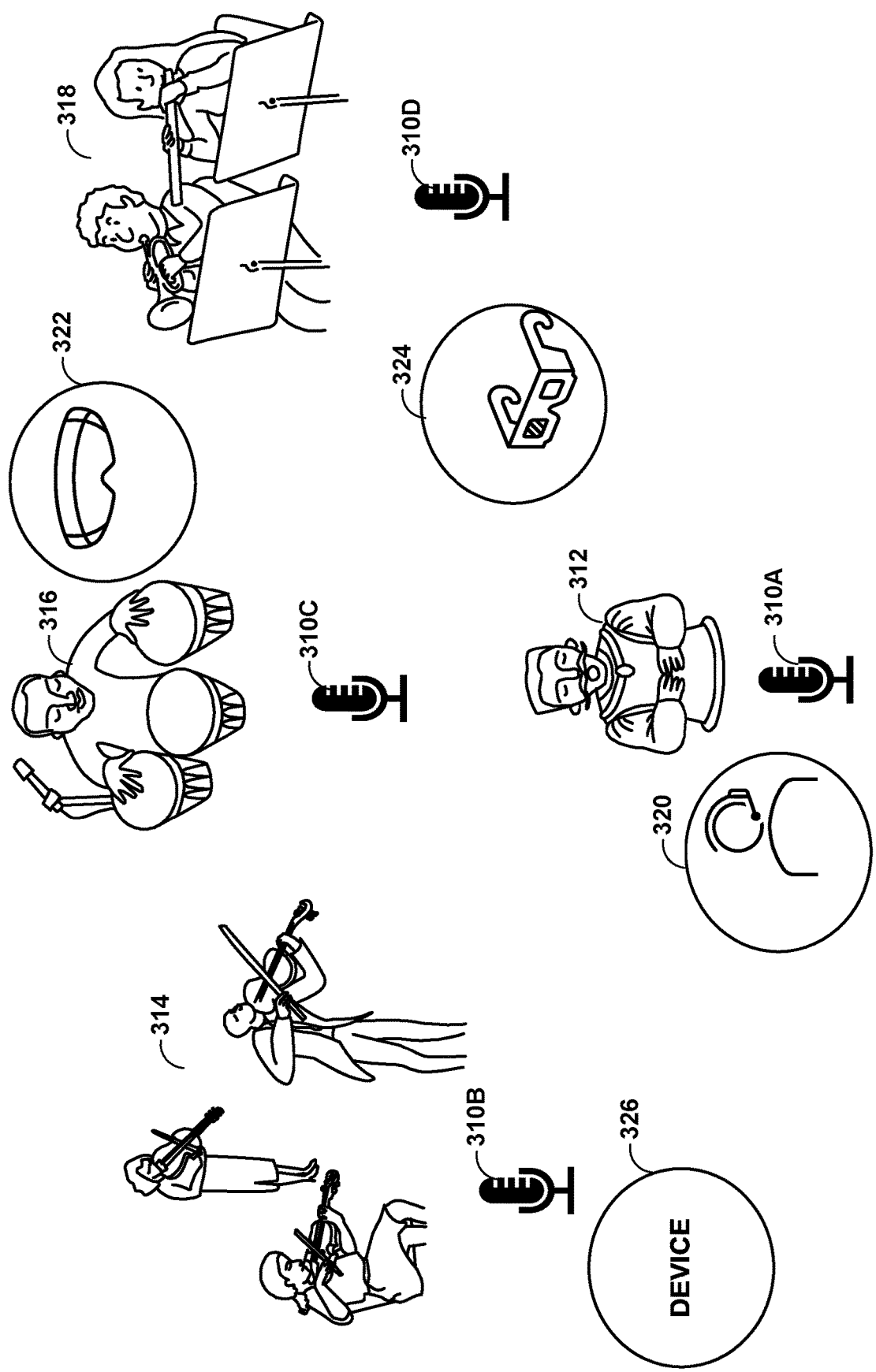
FIG. 8 is a conceptual diagram illustrating an example concert with three or more audio receivers.

FIG. 8 is a conceptual diagram illustrating an example concert with three or more audio receivers. In the example of FIG. 8, a number of musicians are depicted on stage 323. Singer 312 is positioned behind microphone 310A. A string section 314 is depicted behind microphone 310B. Drummer 316 is depicted behind microphone 310C. Other musicians 318 are depicted behind microphone 310D. Microphones 310A-301D may capture audio streams that correspond to the sounds received by the microphones. In some examples, microphones 310A-310D may represent synthesized audio streams. For example, microphone 310A may capture an audio stream(s) primarily associated with singer 312, but the audio stream(s) may also include sounds produced by other band members, such as the string section 314, the drummer 316 or the other musicians 318, while the microphone 310B may capture an audio stream(s) primarily associated with string section 314, but include sounds produced by other band members. In this manner, each of microphones 310A-310D, may capture a different audio stream(s).

Also depicted are a number of devices. These devices represent user devices located at a number of different desired listening positions. Headphones 320 are positioned near microphone 310A, but between microphone 310A and microphone 310B. As such, according to the techniques of this disclosure, content consumer device may select at least one of the audio streams to produce an audio experience for the user of the headphones 320 similar to the user being located where the headphones 320 are located in FIG. 8. Similarly, VR goggles 322 are shown located behind the microphone 310C and between the drummer 316 and the other musicians 318. The content consumer device may select at least one audio stream to produce an audio experience for the user of the VR goggles 322 similar to the user being located where the VR goggles 322 are located in FIG. 8.

Smart glasses 324 are shown located fairly centrally between the microphones 310A, 310C and 310D. The content consumer device may select at least one audio stream to produce an audio experience for the user of the smart glasses 324 similar to the user being located where the smart glasses 324 are located in FIG. 8. Additionally, device 326 (which may represent any device capable of implementing the techniques of this disclosure, such as a mobile handset, a speaker array, headphones, VR goggles, smart glasses, etc.) is shown located in front of microphone 310B. Content consumer device may select at least one audio stream to produce an audio experience for the user of the device 326 similar to the user being located where the device 325 is located in FIG. 8. While specific devices where discussed with respect to particular locations, a used of any of the devices depicted may provide an indication of a desired listening position that is different than depicted in FIG. 8. Any of the devices of FIG. 8 may be used to implement the techniques of this disclosure.

Figure 9:
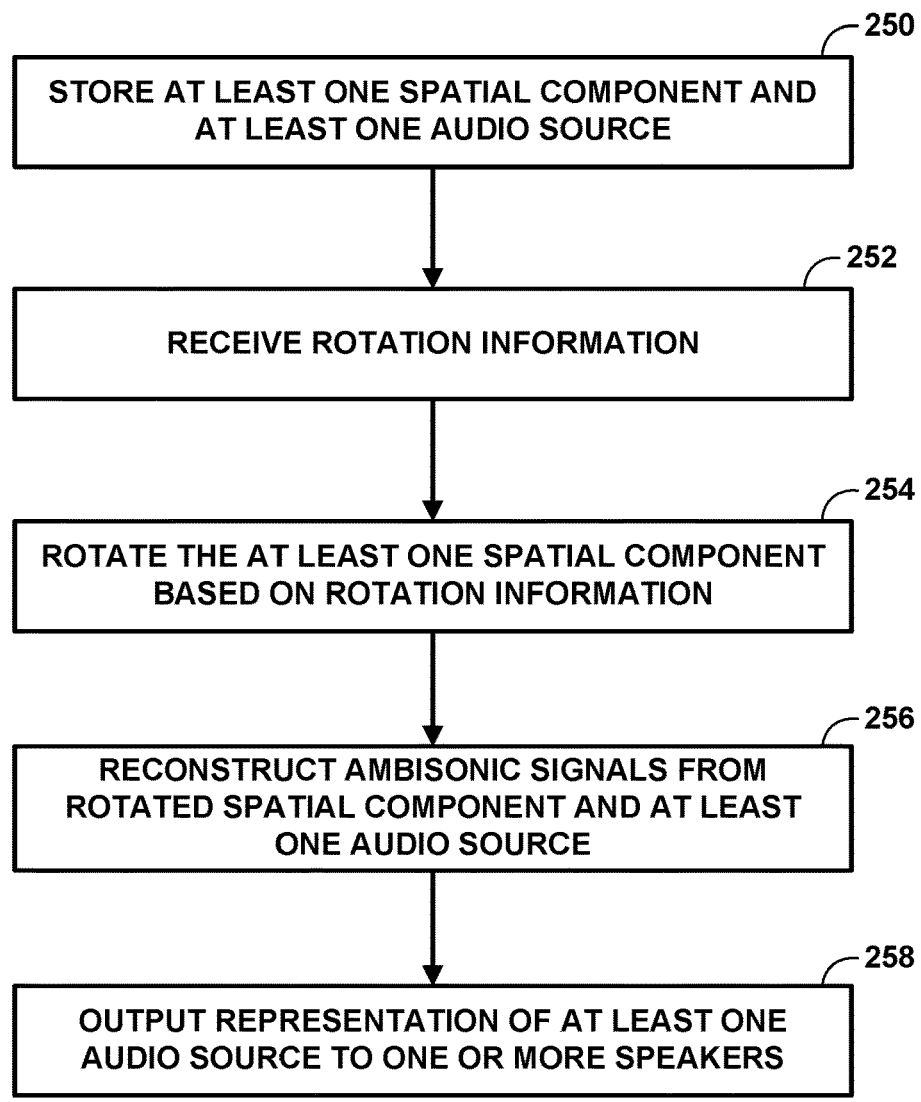
FIG. 9 is a flowchart illustrating an example of using rotation information according to the techniques of this disclosure.

FIG. 9 is a flowchart illustrating an example of using rotation information according to the techniques of this disclosure. The audio playback system 16 may store at least one spatial component and at least one audio source (250). For example, the audio playback system may receive a plurality of audio streams in bitstream 27. The plurality of audio streams may contain at least one spatial component and at least one audio component. The audio playback system 16 may store the at least one spatial component and at least one audio source in memory.

The audio playback system 16 may receive rotation information from motion sensors, such as rotation sensors 200 (252). For example, the rotation sensors 200 may measure the pitch, roll and yaw (theta, phi and psi) of the head as the user 402 moves their head. The measurements of the rotation movement of the head (rotation information) may be received by the audio playback system 16. The audio playback system 15 may rotate the at least one spatial component based on the rotation information (254). For example, spatial vector rotator 205 may rotate the at least one spatial component by multiplying the at least one spatial component by the rotation information through a series of left shifts, through a look-up table, through matrix multiplication, row-by-row multiplication, or by accessing an array and multiplying individual numbers.

The audio playback system 15 may reconstruct ambisonic signals from the rotated at least one spatial component and the at least one audio source (256). For example, the HOA reconstuctor 230 may receive representations of audio sources 225, such as U-vectors, from bitstream 27 or from other portions of audio decoding device 34, from the source device 12 of FIGS. 1A-1C and reconstruct the rotated HOA signals. In some examples, the at least one spatial component comprises a V-vector and the at least one audio source comprises a U-vector. In some examples, the audio playback system 15 may apply a projection matrix to a reference residual vector and dequantized energy signal to reconstruct the U-vector. In some examples, the projection matrix comprises temporal and spatial rotation data. For example, the residual coupling/decoupling rotator 240 of FIG. 7 may create a projection matrix for each of the channels 2-M based on the rotation information from the rotation sensors 200 and the temporal phase information from the residual side temporal decoder 246. In some examples, the audio playback system 15 may output a representation of the at least one audio source, such as a representation based on the ambisonic signals, to one or more speakers (258). In some examples, the audio playback system may combine at least two representations of the at least one audio source by at least one of mixing or interpolation prior to outputting the ambisonic signals. In some examples, the content consumer device 14 may receive a voice command from a microphone and control a display device based on the voice command. In some examples, the content consumer device 14 may receive a wireless signal, such as a wireless bitstream like bitstream 27.

Figure 10:
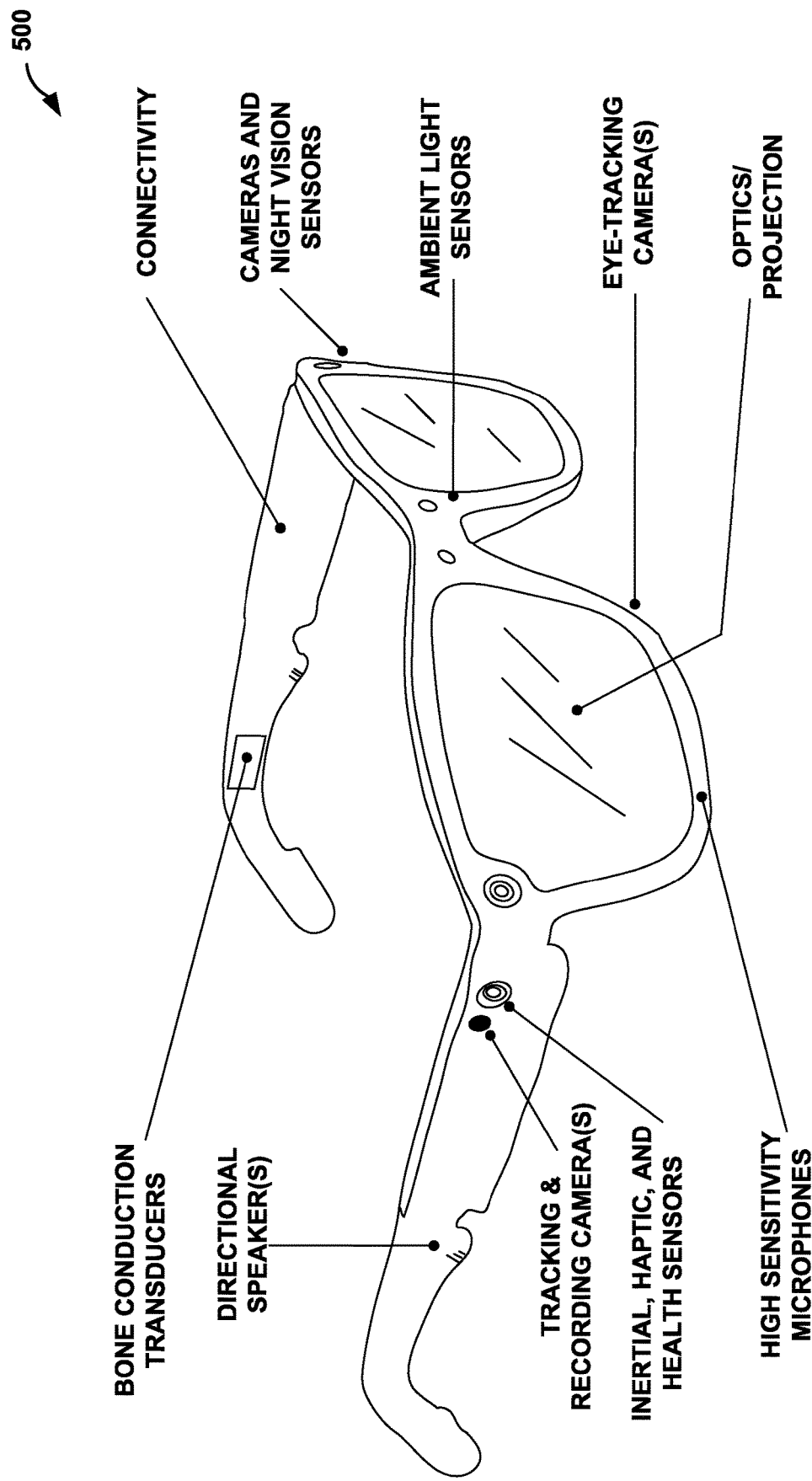
FIG. 10 is a diagram illustrating an example of a wearable device that may operate in accordance with various aspect of the techniques described in this disclosure.

FIG. 10 is a diagram illustrating an example of a wearable device 500 that may operate in accordance with various aspect of the techniques described in this disclosure. In various examples, the wearable device 500 may represent a VR headset (such as the VR headset 400 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 1100, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, Wi-Fi, etc. The wearable device 500 also includes one or more ambient light sensors, and bone conduction transducers. In some instances, the wearable device 500 may also include one or more passive and/or active cameras with fisheye lenses and/or telephoto lenses. Although not shown in FIG. 10, the wearable device 500 also may include one or more light emitting diode (LED) lights. In some examples, the LED light(s) may be referred to as "ultra bright" LED light(s).

The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 10, wearable device 500 may include other types of sensors for detecting translational distance.

Although described with respect to particular examples of wearable devices, such as the VR device 1100 discussed above with respect to the examples of FIG. 10 and other devices set forth in the examples of FIGS. 1A-1C, a person of ordinary skill in the art would appreciate that descriptions related to FIGS. 1A-1C, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 11A:
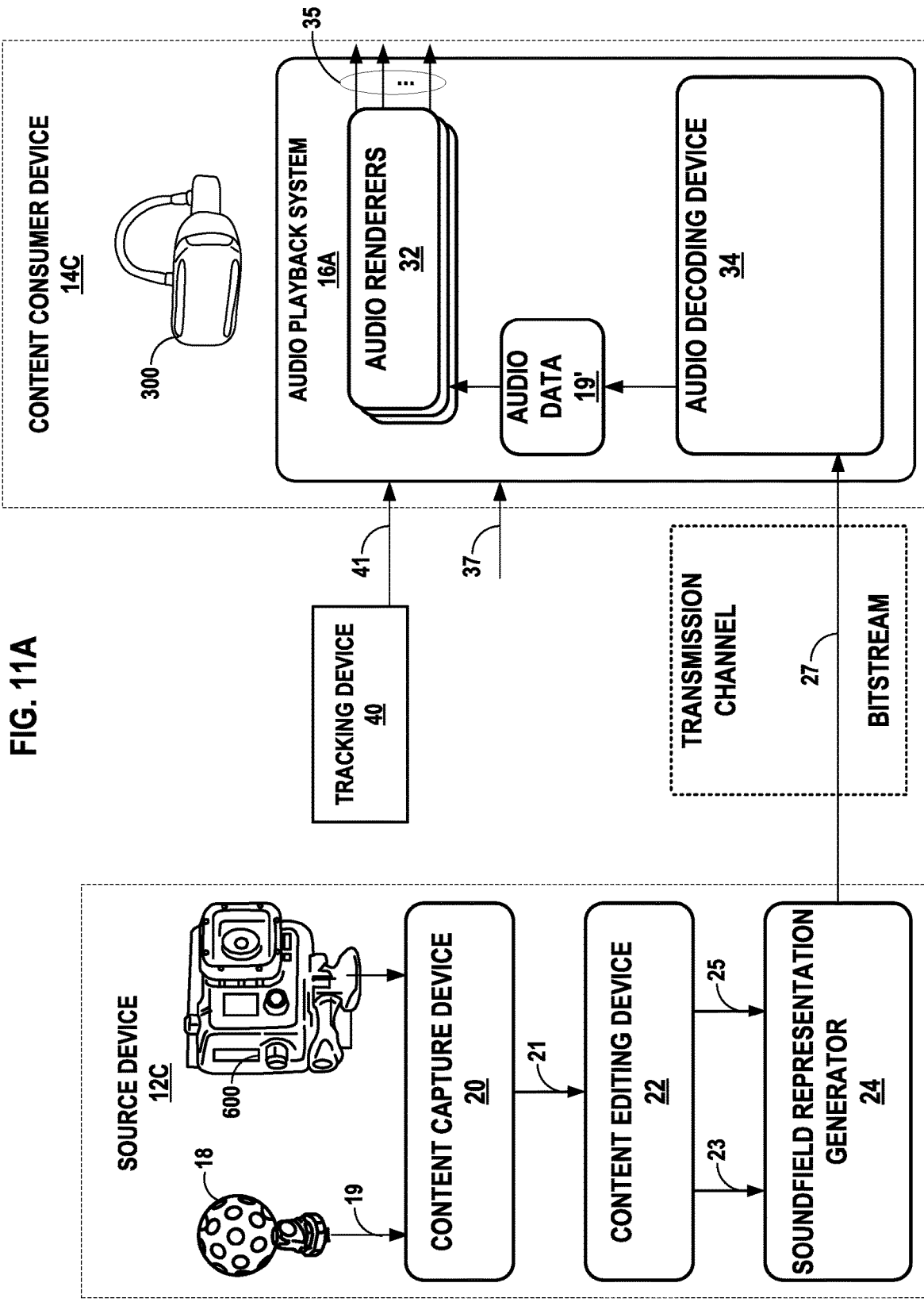
FIGS. 11A and 11B are diagrams illustrating other example systems that may perform various aspects of the techniques described in this disclosure.
Figure 11B:
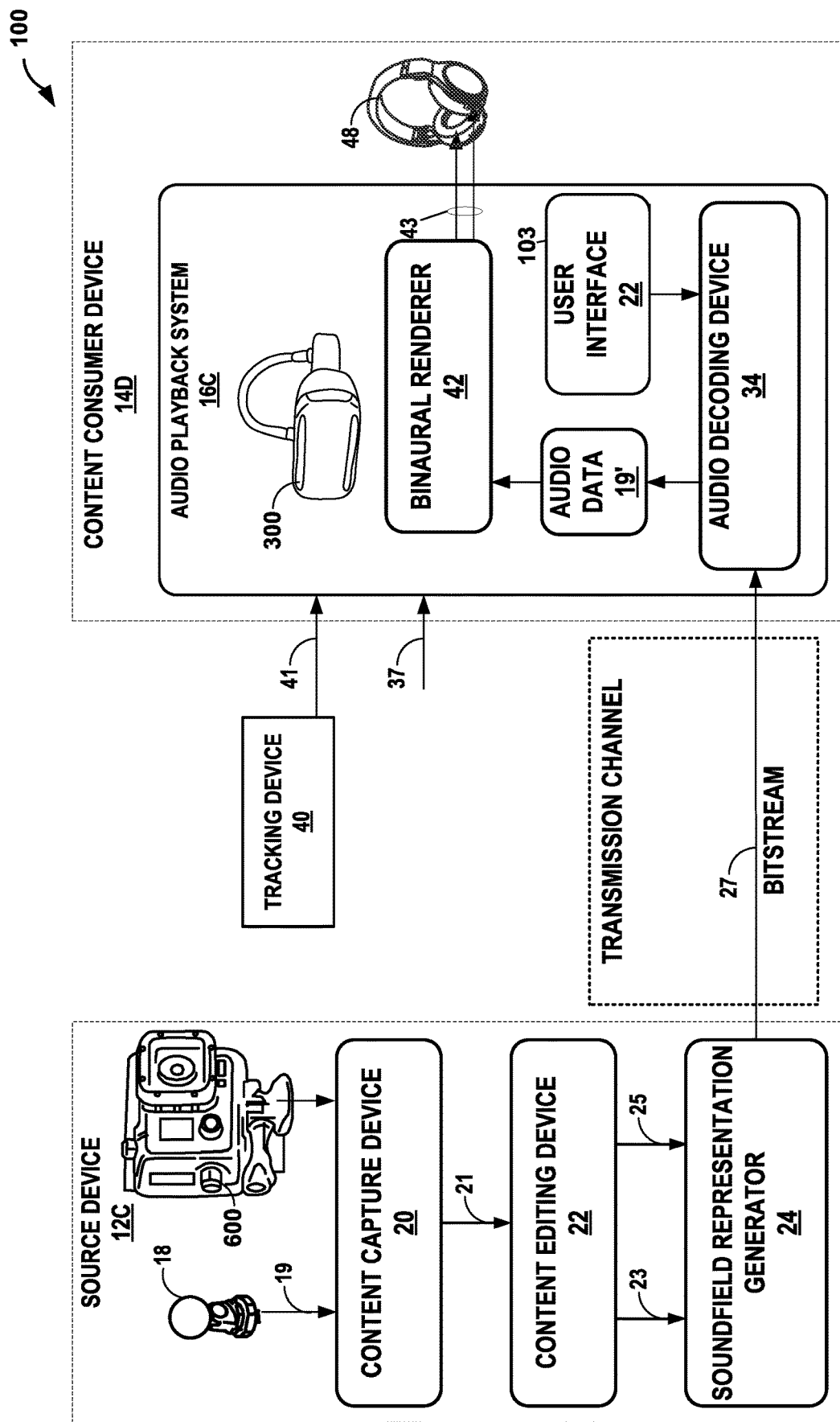

FIGS. 11A and 11B are diagrams illustrating example systems that may perform various aspects of the techniques described in this disclosure. FIG. 11A illustrates an example in which the source device 12 further includes a camera 600. The camera 600 may be configured to capture video data, and provide the captured raw video data to the content capture device 20. The content capture device 20 may provide the video data to another component of the source device 12, for further processing into viewport-divided portions.

In the example of FIG. 11A, the content consumer device 14 also includes the wearable device 300. It will be understood that, in various implementations, the wearable device 300 may be included in, or externally coupled to, the content consumer device 14. The wearable device 300 includes display hardware and speaker hardware for outputting video data (e.g., as associated with various viewports) and for rendering audio data.

FIG. 11B illustrates an example in which the audio renderers 32 shown in FIG. 11A are replaced with a binaural renderer 42 capable of performing binaural rendering using one or more HRTFs or the other functions capable of rendering to left and right speaker feeds 43. The audio playback system 16C may output the left and right speaker feeds 43 to headphones 44.

The headphones 44 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 44 may recreate, based on the left and right speaker feeds 43, the soundfield represented by the audio data 19'. The headphones 44 may include a left headphone speaker and a right headphone speaker which are powered (or, in other words, driven) by the corresponding left and right speaker feeds 43.

Figure 12:
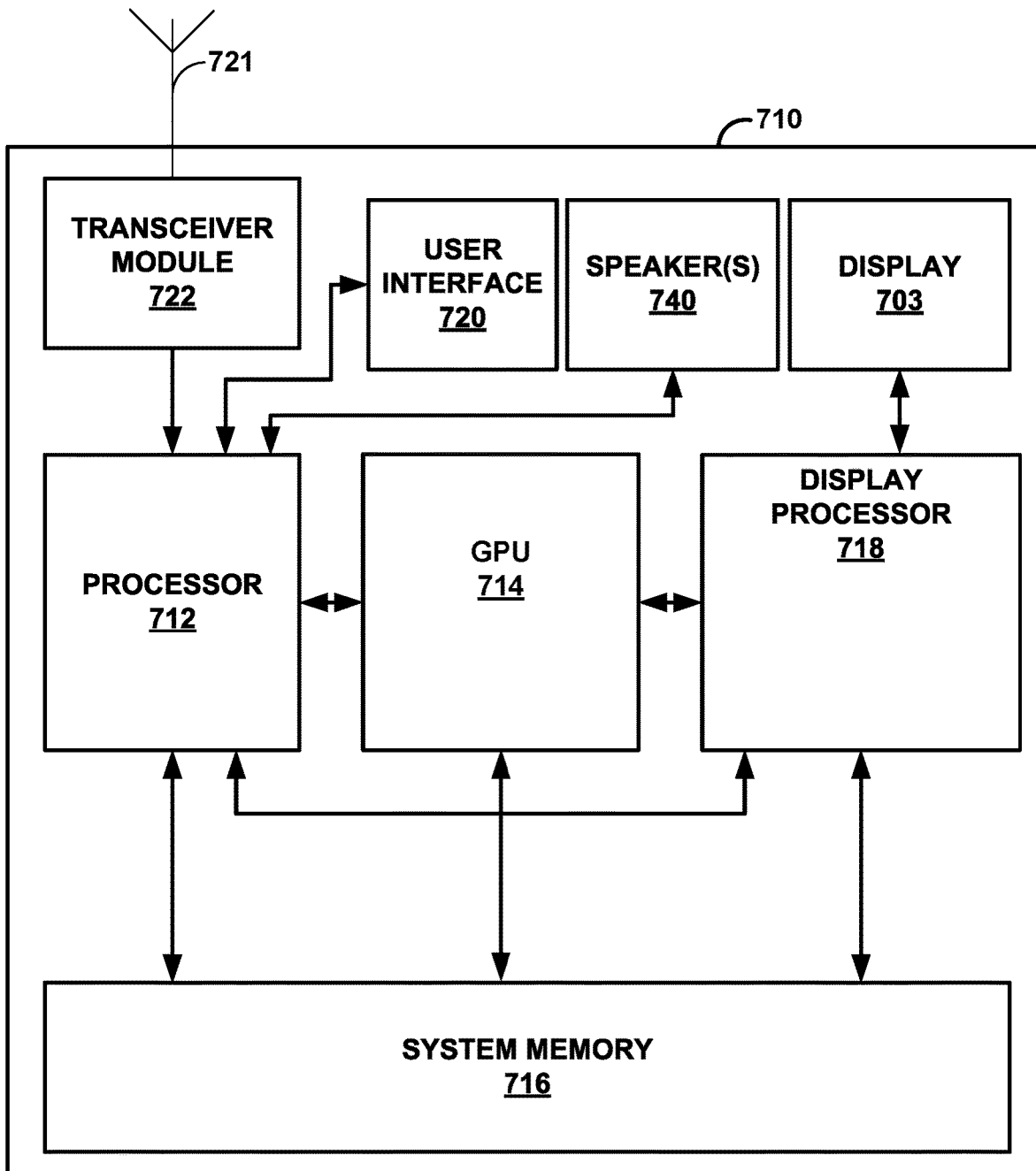
FIG. 12 is a block diagram illustrating example components of one or more of the source device and the content consumer device shown in the example of FIG. 1A-FIG. 1C.

FIG. 12 is a block diagram illustrating example components of one or more of the source device and the content consumer device shown in the example of FIGS. 1A-FIG. 1C. In the example of FIG. 12, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (i.e., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (i.e., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may comprise one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, Wi-Fi, a person area network (PAN) protocol, such as Bluetooth™, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

This disclosure includes the following examples.

Clause 1. A device configured to play one or more of a plurality of audio streams, the device comprising: a memory configured to store at least one spatial component and at least one audio source within the plurality of audio streams; and one or more processors coupled to the memory, and configured to: receive, from motion sensors, rotation information; rotate the at least one spatial component based on the rotation information to form at least one rotated spatial component; and construct ambisonic signals from the at least one rotated spatial component and the at least one audio source, wherein the at least one spatial component describes spatial characteristics associated with the at least one audio source in a spherical harmonic domain representation.

Clause 1.5. The device of clause 1, wherein the at least one spatial component comprises a V-vector and the at least one audio source comprises a U-vector.

Clause 1.6 The device of clause 1.5, wherein the one or more processors are further configured to reconstruct the U-vector.

Clause 1.7. The device of clause 1.6, wherein the one or more processors are further configured to reconstruct the U-vector by applying a projection matrix to a reference residual vector and dequantized energy signal.

Clause 1.8 The device of clause 1.7, wherein the projection matrix comprises temporal and spatial rotation data.

Clause 2. The device of clause 1, wherein the one or more processors are further configured to output the at least one audio source to one or more speakers.

Clause 3. The device of any combination of clauses 1-2, wherein the one or more processors are further configured to combine at least two of the at least one audio source.

Clause 4. The device of clause 3, wherein the one or more processors combine the at least two of the at least one audio source by at least one of mixing or interpolation.

Clause 5. The device of any combination of clauses 1-4, further comprising a display device.

Clause 6. The device of clause 5, further comprising a microphone, wherein the one or more processors are further configured to receive a voice command from the microphone and control the display device based on the voice command.

Clause 7. The device of any combination of clauses 1-6, further comprising one or more speakers.

Clause 8. The device of any combination of clauses 1-7, wherein the device comprises a mobile handset.

Clause 9. The device of any combination of clauses 1-7, wherein the device comprises an extended reality headset, and wherein the acoustical space comprises a scene represented by video data captured by a camera.

Clause 10. The device of any combination of clauses 1-7, wherein the device comprises an extended reality headset, and wherein the acoustical space comprises a virtual world.

Clause 11. The device of any combination of clauses 1-10, further comprising a head-mounted device configured to present the acoustical space.

Clause 12. The device of any combination of clauses 1-11, further comprising a wireless transceiver, the wireless transceiver being coupled to the one or more processors and being configured to receive a wireless signal.

Clause 13. The device of clause 12, wherein the wireless signal conforms to a personal area network standard.

Clause 13.5 The device of clause 13, wherein the personal area network standard comprises an AptX standard.

Clause 14. The device of clause 12, wherein the wireless signal conforms to fifth generation (5G) cellular protocol.

Clause 15. A method of playing one or more of a plurality of audio streams comprising: storing, by a memory, at least one spatial component and at least one audio source within the plurality of audio streams; receiving, by one or more processors from motion sensors, rotation information; rotating, by the one or more processors, the at least one spatial component based on the rotation information to form at least one rotated spatial component; and constructing, by the one or more processors, ambisonic signals from the rotated at least one spatial component and the at least one audio source, wherein the at least one spatial component describes spatial characteristics associated with the at least one audio source in a spherical harmonic domain.

Clause 15.5 The method of clause 15, wherein the at least one spatial component comprises a V-vector and the at least one audio source comprises a U-vector.

Clause 15.6 The method of clause 15.5, further comprising reconstructing the U-vector.

Clause 15.7. The method of clause 15.6, wherein the reconstructing the U-vector comprises applying a projection matrix to a reference residual vector and dequantized energy signal.

Clause 15.8 The device of clause 15.7, wherein the projection matrix comprises temporal and spatial rotation data.

Clause 16. The method of clause 15, further comprising outputting, by the one or more processors, the at least one audio source to one or more speakers.

Clause 17. The method of any combination of clauses 15-16, further comprising combining, by the one or more processors, at least two of the at least one audio source.

Clause 18. The method of clause 17, wherein the combining the at least two of the at least one audio source is by at least one of mixing or interpolation.

Clause 19. The method of any combination of clauses 15-18, further comprising receiving a voice command from a microphone and controlling a display device based on the voice command.

Clause 20. The method of any combination of clauses 15-19, wherein the method is performed upon a mobile handset.

Clause 21. The method of any combination of clauses 15-19, wherein the method is performed upon an extended reality headset, and wherein the acoustical space comprises a scene represented by video data captured by a camera.

Clause 22. The method of any combination of clauses 15-19, wherein the method is performed upon an extended reality headset, and wherein the acoustical space comprises a virtual world.

Clause 23. The method of any combination of clauses 15-22, wherein the method is performed upon a head-mounted device configured to present the acoustical space.

Clause 24. The method of any combination of clauses 15-23, further comprising receiving a wireless signal.

Clause 25. The method of clause 24, wherein the wireless signal conforms to a personal area network standard.

Clause 25.5 The method of clause 25, wherein the personal area network standard comprises an AptX standard.

Clause 26. The method of clause 24, wherein the wireless signal conforms to fifth generation (5G) cellular protocol.

Clause 27. A device configured to play one or more of a plurality of audio streams, the device comprising: means for storing at least one spatial component and at least one audio source within the plurality of audio streams; means for receiving from motion sensors, rotation information; means for rotating the at least one spatial component to form at least one rotated spatial component; and means for constructing ambisonic signals from the rotated at least one spatial component and the at least one audio source, wherein the at least one spatial component describes spatial characteristics associated with the at least one audio source in a spherical harmonic domain.

Clause 27.5 The device of clause 27, wherein the at least on spatial component comprises a V-vector and the at least one audio source comprises a U-vector.

Clause 27.6 The device of clause 27.5, further comprising means for reconstructing the U-vector.

Clause 27.7. The device of clause 27.6, wherein the means for reconstructing the U-vector applies a projection matrix to a reference residual vector and dequantized energy signal.

Clause 27.8 The device of clause 27.7, wherein the projection matrix comprises temporal and spatial rotation data.

Clause 28. The device of clause 27, further comprising means for outputting the at least one audio source to one or more speakers.

Clause 29. The device of any combination of clauses 27-28, further comprising means for combining at least two of the at least one audio source.

Clause 30. The device of clause 29, wherein the combining the at least two of the at least one audio source is by at least one of mixing or interpolation.

Clause 31. The device of clause and combination of clauses 27-30, further comprising means for receiving a voice command from a microphone and means for controlling a display device based on the voice command.

Clause 32. The device of any combination of clauses 27-31, wherein the device comprises an extended reality headset, and wherein the acoustical space comprises a scene represented by video data captured by a camera.

Clause 33. The device of any combination of clauses 27-32, wherein the device comprises a mobile handset.

Clause 34. The device of any combination of clauses 27-32, wherein the device comprises an extended reality headset, and wherein the acoustical space comprises a virtual world.

Clause 35. The device of any combination of clauses 27-34, wherein the device comprises a head-mounted device configured to present the acoustical space.

Clause 36. The device of any combination of clauses 27-35, further comprising means for receiving a wireless signal.

Clause 37. The device of clause 36, wherein the wireless signal conforms to a personal area network standard.

Clause 37.5. The device of clause 37, wherein the personal area network standard comprises an AptX standard.

Clause 38. The device of clause 36, wherein the wireless signal conforms to fifth generation (5G) cellular protocol.

Clause 39. A non-transitory computer-readable storage medium having stored thereon instructions that, when executed, cause one or more processors to: store at least on spatial component and at least one audio source within the plurality of audio streams; receive, from motion sensors, rotation information; rotate the at least one spatial component based on the rotation information to form at least one rotated spatial component; and construct ambisonic signals from the at least one rotated spatial component and the at least one audio source, wherein the at least one spatial component describes spatial characteristics associated with the at least one audio source in a spherical harmonic domain.

Clause 39.5. The non-transitory computer-readable storage medium of clause 39, wherein the at least one spatial component comprises a V-vector and the at least one audio source comprises a U-vector.

Clause 39.6. The non-transitory computer-readable storage medium of clause 39.5, further having instructions, stored thereon, that when executed cause the one or more processors to reconstruct the U-vector.

Clause 39.7. The non-transitory computer-readable storage medium of clause 39.6, further having instructions, stored thereon, that when executed cause the one or more processors to reconstruct the U-vector comprises bay applying a projection matrix to a reference residual vector and dequantized energy signal.

Clause 39.8. The non-transitory computer-readable storage medium of clause 39.7, wherein the projection matrix comprises temporal and spatial rotation data.

Clause 40. The non-transitory computer-readable storage medium of clause 39, wherein the instructions, when executed, cause one or more processors to output the at least one audio source to one or more speakers.

Clause 41. The non-transitory computer-readable storage medium of any combination of clauses 39-40, wherein the instructions, when executed, cause one or more processors to combine at least two of the at least one audio source.

Clause 42. The non-transitory computer-readable storage medium of clause 41, wherein the instructions, when executed, cause one or more processors to combine the at least two of the at least one audio source by at least one of mixing or interpolation.

Clause 43. The non-transitory computer-readable storage medium of any of clauses 39-42, wherein the instructions, when executed, cause one or more processors to control a display device based on a voice command.

Clause 44. The non-transitory computer-readable storage medium of any combination of clauses 39-43, wherein the instructions, when executed, cause one or more processors to present the acoustical space on a mobile handset.

Clause 45. The non-transitory computer-readable storage medium of any combination of clauses 39-44, wherein the acoustical space comprises a scene represented by video data captured by a camera.

Clause 46. The non-transitory computer-readable storage medium of any combination of clauses 39-44, wherein the acoustical space comprises a virtual world.

Clause 47. The non-transitory computer-readable storage medium of any combination of clauses 39-46, wherein the instructions, when executed, cause one or more processors to present the acoustical space on a head-mounted device.

Clause 48. The non-transitory computer-readable storage medium of any combination of clauses 39-47, wherein the instructions, when executed, cause one or more processors to receive a wireless signal.

Clause 49. The non-transitory computer-readable storage medium of clause 48, wherein the wireless signal conforms to a personal area network standard.

Clause 49.5 The non-transitory computer-readable storage medium of clause 49, wherein the personal area network standard comprises an AptX standard.

Clause 50. The non-transitory computer-readable storage medium of clause 48, wherein the wireless signal conforms to fifth generation (5G) cellular protocol.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to play one or more of a plurality of audio streams, the device comprising:
    a memory configured to store at least one spatial component and at least one audio source within the plurality of audio streams; and
    one or more processors coupled to the memory, and configured to:
    receive, from motion sensors, rotation information;
    rotate the at least one spatial component based on the rotation information to form at least one rotated spatial component; and
    reconstruct ambisonic signals from the at least one rotated spatial component and the at least one audio source,
    wherein the at least one spatial component describes spatial characteristics associated with the at least one audio source in a spherical harmonic domain representation.

2. The device of claim 1, wherein the at least one spatial component comprises a V-vector and the at least one audio source comprises a U-vector.

3. The device of claim 2, wherein the one or more processors are further configured to reconstruct the U-vector by applying a projection matrix to a reference residual vector and dequantized energy signal.

4. The device of claim 3, wherein the projection matrix comprises temporal and spatial rotation data.

5. The device of claim 1, wherein the one or more processors are further configured to output a representation of the at least one audio source to one or more speakers.

6. The device of claim 1, wherein the one or more processors are further configured to combine at least two representations of the at least one audio source by at least one of mixing or interpolation.

7. The device of claim 1, further comprising a display device.

8. The device of claim 7, further comprising a microphone, wherein the one or more processors are further configured to receive a voice command from the microphone and control the display device based on the voice command.

9. The device of claim 1, further comprising one or more speakers.

10. The device of claim 1, wherein the device comprises a mobile handset.

11. The device of claim 1,
    wherein the device comprises an extended reality headset, and
    wherein an acoustical space comprises a scene represented by video data captured by a camera.

12. The device of claim 1,
    wherein the device comprises an extended reality headset, and
    wherein an acoustical space comprises a virtual world.

13. The device of claim 1, further comprising a head-mounted device configured to present an acoustical space.

14. The device of claim 1, further comprising a wireless transceiver, the wireless transceiver being coupled to the one or more processors and being configured to receive a wireless signal, the wireless signal comprising one of more of a signal conforming to a $5^{th}$ generation cellular standard, a Bluetooth standard or a Wi-Fi standard.

15. A method of playing one or more of a plurality of audio streams comprising:
    storing, by a memory, at least one spatial component and at least one audio source within the plurality of audio streams;
    receiving, by one or more processors from motion sensors, rotation information;
    rotating, by the one or more processors, the at least one spatial component based on the rotation information to form at least one rotated spatial component; and
    reconstructing, by the one or more processors, ambisonic signals from the rotated at least one spatial component and the at least one audio source,
    wherein the at least one spatial component describes spatial characteristics associated with the at least one audio source in a spherical harmonic domain representation.

16. The method of claim 15, wherein the at least one spatial component comprises a V-vector and the at least one audio source comprises a U-vector.

17. The method of claim 16, further comprising reconstructing the U-vector by applying a projection matrix to a reference residual vector and dequantized energy signal.

18. The method of claim 17, wherein the projection matrix comprises temporal and spatial rotation data.

19. The method of claim 15, further comprising outputting, by the one or more processors, a representation of the at least one audio source to one or more speakers.

20. The method of claim 15, further comprising combining, by the one or more processors, at least two representations of the at least one audio source by at least one of mixing or interpolation.

21. The method of claim 15, further comprising receiving a voice command from a microphone and controlling a display device based on the voice command.

22. The method of claim 15, wherein the method is performed upon a mobile handset.

23. The method of claim 15, wherein the method is performed upon an extended reality headset, and wherein an acoustical space comprises a scene represented by video data captured by a camera.

24. The method of claim 15, wherein the method is performed upon an extended reality headset, and wherein an acoustical space comprises a virtual world.

25. The method of claim 15, wherein the method is performed upon a head-mounted device configured to present an acoustical space.

26. The method of claim 15, further comprising receiving a wireless signal, the wireless signal comprising one of more of a signal conforming to a $5^{th}$ generation cellular standard, a Bluetooth standard or a Wi-Fi standard.

27. A device configured to play one or more of a plurality of audio streams, the device comprising:
means for storing at least one spatial component and at least one audio source within the plurality of audio streams;
means for receiving from motion sensors, rotation information;
means for rotating the at least one spatial component to form at least one rotated spatial component; and
means for reconstructing ambisonic signals from the rotated at least one spatial component and the at least one audio source,
wherein the at least one spatial component describes spatial characteristics associated with the at least one audio source in a spherical harmonic domain representation.

28. A non-transitory computer-readable storage medium having stored thereon instructions that, when executed, cause one or more processors to:
store at least one spatial component and at least one audio source within a plurality of audio streams;
receive, from motion sensors, rotation information;
rotate the at least one spatial component based on the rotation information to form at least one rotated spatial component; and
reconstruct ambisonic signals from the at least one rotated spatial component and the at least one audio source,
wherein the at least one spatial component describes spatial characteristics associated with the at least one audio source in a spherical harmonic domain representation.

29. The non-transitory computer-readable storage medium of claim 28, wherein the at least one spatial component comprises a V-vector and the at least one audio source comprises a U-vector.

30. The non-transitory computer-readable storage medium of claim 29, further having instructions, stored thereon, that when executed cause the one or more processors to reconstruct the U-vector comprises by applying a projection matrix to a reference residual vector and dequantized energy signal.

* * * * *